United States Patent
Lewis et al.

(10) Patent No.: US 7,065,634 B2
(45) Date of Patent: Jun. 20, 2006

(54) METHODS AND SYSTEMS FOR DEVELOPING DATA FLOW PROGRAMS

(75) Inventors: Brad R. Lewis, Broomfield, CO (US); Michael L. Boucher, Lafayette, CO (US); Noah Horton, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 488 days.

(21) Appl. No.: 10/005,783

(22) Filed: Nov. 8, 2001

(65) Prior Publication Data

US 2002/0157086 A1 Oct. 24, 2002

Related U.S. Application Data

(63) Continuation-in-part of application No. 09/244,138, filed on Feb. 4, 2001.

(51) Int. Cl.
*G06F 9/44* (2006.01)
*G06F 9/45* (2006.01)

(52) U.S. Cl. .................................. 712/227; 717/132
(58) Field of Classification Search ................ 712/227; 717/124, 129, 132, 127; 714/35
See application file for complete search history.

(56) References Cited

U.S. PATENT DOCUMENTS 5,457,806 A * 10/1995 Kitamura ................. 709/224
5,535,318 A * 7/1996 Motoyama et al. ......... 715/514
5,963,972 A * 10/1999 Calder et al. ............... 711/129

\* cited by examiner

*Primary Examiner*—Daniel H. Pan
(74) *Attorney, Agent, or Firm*—Sonnenschein Nath & Rosenthal, LLP

(57) ABSTRACT

Methods, systems, and articles of manufacture consistent with the present invention provide a development tool that enables computer programmers to design and develop a data flow program for execution in a multiprocessor computer system. The tool allows the programmer to define a region divided into multiple blocks, wherein each block is associated with data operated on by code segments of the data flow program. The development tool also maintains dependencies among the blocks, each dependency indicating a relationship between two blocks that indicates that the portion of the program associated with a first block of the relationship needs the resultant data provided by the portions of the program associated with a second block of the relationship. The development tool supports several debugging commands, including insertion of multiple types of breakpoints, adding and deleting dependencies, single stepping data flow program execution, and the like.

56 Claims, 38 Drawing Sheets

A

B

C

3400

3500

METHODS AND SYSTEMS FOR DEVELOPING DATA FLOW PROGRAMS

CROSS-REFERENCE TO RELATED APPLICATIONS

This application is related to the following pending patent applications, and is a Continuation-in-Part of Ser. No. 09/244,138 filed Feb. 4, 2001:

U.S. patent application No. 09/244,137, entitled "Method, Apparatus, and Article of Manufacture for Developing and Executing Data Flow Programs," and filed on Feb. 4, 2001.

U.S. patent application No. 09/244,138 entitled "Method Apparatus, and Article of Manufacture for Developing and Executing Data Flow Programs, and Optimizing User Input Specifications", filed Feb. 4, 2001.

The entirety of each application is incorporated herein by reference.

FIELD OF THE INVENTION

This invention relates to the field of multiprocessor computer systems and, more particularly, to data driven processing of computer programs using a multiprocessor computer system.

BACKGROUND OF THE INVENTION

Multiprocessor computer systems include two or more processors that execute the instructions of a computer program. One processor executes a particular set of instructions while other processors execute different sets of instructions.

Fast computer systems, like multiprocessor computer systems, have stimulated the rapid growth of a new way of performing scientific research. The broad classical branches of theoretical science and experimental science have been joined by computational science. Computational scientists simulate on supercomputers phenomena too complex to be reliably predicted by theory and too dangerous or expensive to be reproduced in a laboratory. Successes in computational science have caused demand for supercomputing resources to rise sharply in recent years.

During this time, multiprocessor computer systems, also referred to as "parallel computers," have evolved from experimental designs in laboratories to become the everyday tools of computational scientists who need the most advanced computing resources to solve their problems. Several factors have stimulated this evolution. It is not only that the speed of light and the effectiveness of heat dissipation impose physical limits on the speed of a single processor. It is also that the cost of advanced single-processor computers increases more rapidly than their power. And price/performance ratios become more favorable if the required computational power can be found from existing resources instead of purchased. This factor has caused many sites to use existing workstation networks, originally purchased to do modest computational chores, as "SCAN"s (SuperComputers At Night) by utilizing the workstation network as a parallel computer. This scheme has proven so successful, and the cost effectiveness of individual workstations has increased so rapidly, that networks of workstations have been purchased to be dedicated to parallel jobs that used to run on more expensive supercomputers. Thus, considerations of both peak performance and price/performance are pushing large-scale computing in the direction of parallelism. Despite these advances, parallel computing has not yet achieved widespread adoption.

The biggest obstacle to the adoption of parallel computing and its benefits in economy and power is the problem of inadequate software. The programmer of a program implementing a parallel algorithm for an important computational science problem may find the current software environment to be more of an obstruction than smoothing the path to use of the very capable, cost-effective hardware available. This is because computer programmers generally follow a "control flow" model when developing programs, including programs for execution by multiprocessor computer systems. According to this model, the computer executes a program's instructions sequentially (i.e., in series from the first instruction to the last instruction) as controlled by a program counter. Although this approach tends to simplify the program development process, it is inherently slow.

For example, when the program counter reaches a particular instruction in a program that requires the result of another instruction or set of instructions, the particular instruction is said to be "dependent" on the result and the processor cannot execute that instruction until the result is available. Moreover, executing programs developed under the control flow model on multiprocessing computer systems results in a significant waste of resources because of these dependencies. For example, a first processor executing one set of instructions in the control flow program may have to wait for some time until a second processor completes execution of another set of instructions, the result of which is required by the first processor to perform its set of instructions. Wait-time translates into an unacceptable waste of computing resources in that at least one of the processors is idle the whole time while the program is running.

To better exploit parallelism in a program some scientists have suggested use of a "data flow" model in place of the control flow model. The basic concept of the data flow model is to enable the execution of an instruction whenever its required operands become available, and thus, no program counters are needed in data-driven computations. Instruction initiation depends on data availability, independent of the physical location of an instruction in the program. In other words, instructions in a program are not ordered. The execution simply follows the data dependency constraints.

Programs for data-driven computations can be represented by data flow graphs. An example data flow graph is illustrated in FIG. 1 for the calculation of the following expression:

$$z=(x+y)*2$$

When, for example, x is 5 and y is 3, the result z is 16. As shown graphically in the figure, z is dependent on the result of the sum of x and y. The data flow graph is a directed acyclic graph ("DAG") whose nodes correspond to operators and arcs are pointers for forwarding data. The graph demonstrates sequencing constraints (i.e., constraints with data dependencies) among instructions.

For example, in a conventional computer, program analysis is often done (i) when a program is compiled to yield better resource utilization and code optimization, and (ii) at run time to reveal concurrent arithmetic logic activities for higher system throughput. For instance, consider the following sequence of instructions:

1. $P=X+Y$

2. $Q=P/Y$

3. $R=X*P$

4. $S=R-Q$

5. $T=R*P$

6. $U=S/T$

The following five computational sequences of these instructions are permissible to guarantee the integrity of the result when executing the instructions on a serial computing system (e.g., a uniprocessor system):

1, 2, 3, 4, 5, 6
1, 3, 2, 4, 5, 6
1, 2, 3, 5, 4, 6
1, 3, 2, 5, 4, 6
1, 3, 5, 2, 4, 6

For example, the first instruction must be executed first, but the second or third instruction can be executed second, because the result of the first instruction is required for either the second or third instruction, but neither the second nor the third requires the result of the other. The remainder of each sequence follows the rule that no instruction can be executed until its operands (or inputs) are available.

In a multiprocessor computer system with two processors, however, it is possible to perform the six operations in four steps (instead of six) with the first processor computing step 1, followed by both processors simultaneously computing steps 2 and 3, followed by both processors simultaneously steps 4 and 5, and finally either processor computing step 6. This is an obvious improvement over the uniprocessor approach because execution time is reduced.

Using data flow as a method of parallelization will thus extract the maximum amount of parallelism from a system. Most source code, however, is in a control form, which is difficult and clumsy to parallelize efficiently for all types of problems.

It is therefore desirable to provide a facility for programmers to more easily develop, visualize, debug, and optimize data flow programs and to convert existing control flow programs into data flow programs for execution on multiprocessor computer systems.

SUMMARY OF THE INVENTION

Methods, systems, and articles of manufacture consistent with the present invention facilitate development (e.g., visualization, debugging and optimization) of new programs according to the data flow model. According to one aspect of the present invention, such methods, systems, and articles of manufacture, as embodied and broadly described herein, include a development tool that implements a block dependency approach that allows an operator to define a memory region and divide the memory region into multiple blocks. Each block is associated with data (e.g., a matrix) needed by a function or other program operation, as well as code that operates on that data. It is noted that a "block" refers to one or more data elements in memory and does not imply a particular shape (e.g., square or rectangular) for the data elements or their placement in memory. In other words, a block refers to a portion of data in memory, but does not necessarily indicate the structure or arrangement of the data in the memory. Additionally, the operator specifies any dependencies among the blocks, for example, a subsequent block may be specified as dependent on an initial block. Such a dependency indicates that, before executing, the code associated with the subsequent block needs the code associated with the initial block to execute on the data associated with the initial block. As will be explained in detail below, the development tool facilitates development (including visualization, debugging, and optimization) of data flow programs using the block dependency approach outlined above.

Methods, systems, and articles of manufacture consistent with the present invention overcome the shortcomings of the related art, for example, by providing a data flow program development tool. The development tool allows a programmer to visually identify data dependencies between code segments, observe the execution of a data flow program under development, insert breakpoints, and modify data block code and data assignments and dependencies. Thus, a programmer may more easily develop a new data flow program or convert a control flow program to the data flow paradigm.

In accordance with methods consistent with the present invention, a method is provided for developing data flow programs. The method includes dividing a memory area into blocks and associating each block with data and with at least one code segment, generating a graph representation of a data flow program, the representation comprising nodes associated with the blocks, and dependencies between blocks that give rise to an execution order for the code segments, and pausing execution of code segments in response to a debugging command including at least one of inserting a breakpoint at a breakpoint node, and adding or deleting dependencies between nodes.

In accordance with systems consistent with the present invention, a data processing system is provided for developing data flow programs. The data processing system includes a memory comprising a data flow development tool comprising instructions that associate data processed by a data flow program to blocks in memory, associate code segments of the data flow program to blocks, determine dependencies between blocks that give rise to an execution order for the blocks, and monitor for debugging commands including at least one of inserting a breakpoint at a breakpoint node, and adding or deleting dependencies between nodes. The data processing system further includes a processing unit that runs the data flow development tool.

In accordance with articles of manufacture consistent with the present invention, a computer readable medium is provided. The computer readable medium contains instructions that cause a data processing system to perform a method for developing data flow programs. The method includes dividing a memory area into blocks and associating each block with data and with at least one code segment, generating a graph representation of a data flow program, the representation comprising nodes associated with the blocks, and dependencies between blocks that give rise to an execution order for the code segments, and pausing execution of code segments in response to a debugging command including at least one of inserting a breakpoint at a breakpoint node, and adding or deleting dependencies between nodes.

In accordance with articles of manufacture consistent with the present invention, a computer readable medium is provided that is encoded with a data structure accessed by a data flow development tool run by a processor in a data processing system. The data structure includes nodes assigned to data processed by a data flow program and to code segments of the data flow program, dependencies between nodes, and debugging information including at least one of a breakpoint node, and a next step node.

Other apparatus, methods, features and advantages of the present invention will be or will become apparent to one with skill in the art upon examination of the following figures and detailed description. It is intended that all such additional systems, methods, features and advantages be

DETAILED DESCRIPTION OF THE INVENTION

Figure 1:
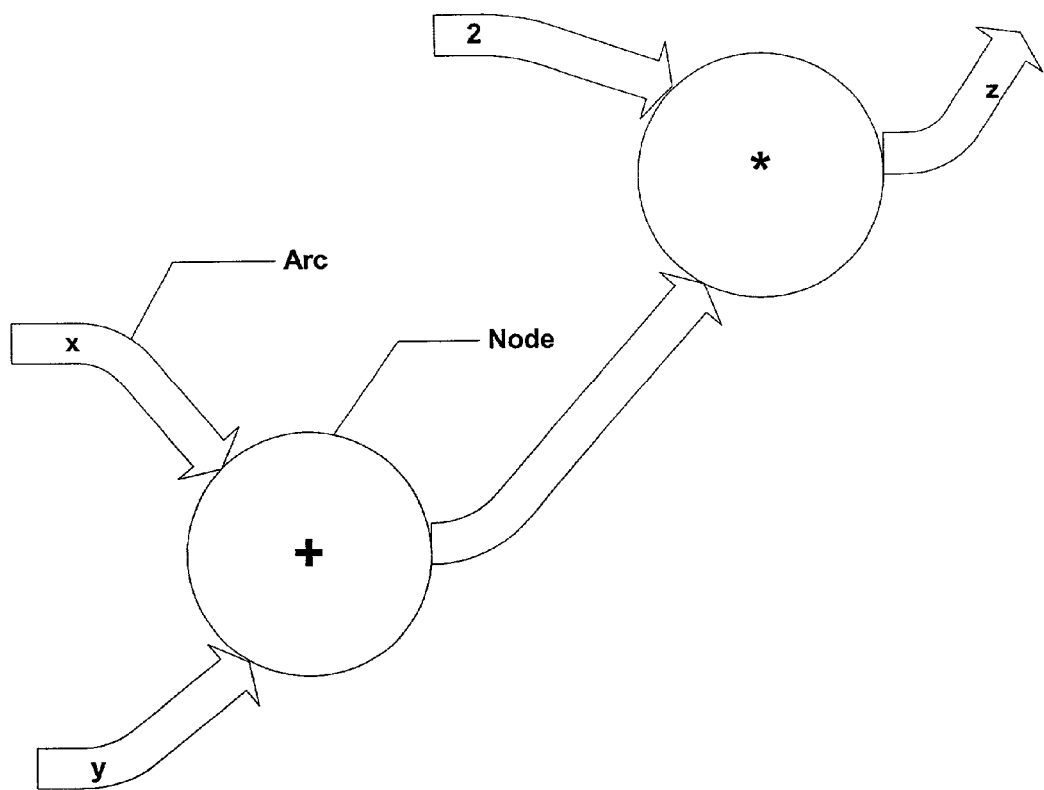
FIG. 1 depicts an example data flow graph for the calculation of an expression.

Reference will now be made in detail to an implementation consistent with the present invention as illustrated in the accompanying drawings. Wherever possible, the same reference numbers will be used throughout the drawings and the following description to refer to the same or like parts. Certain aspects of the present invention are summarized below before turning to Figures.

Methods, systems, and articles of manufacture consistent with the present invention enable programmers to develop new data flow programs and to convert existing control flow programs to the data flow paradigm. To that end, the methods, systems, and articles of manufacture may implement a data flow program development tool.

Data flow programs developed in accordance with the principles of the present invention may be executed on a multiprocessor computer system or a distributed computer system using the data flow model. The development tool may execute on the same or different data processing system from that used for executing the data flow program under development.

Generally, the development tool facilitates dividing a memory region into blocks. Each block is associated with certain data and code, with dependencies specified between blocks. As will be explained in more detail below, blocks that do not depend on one another can be executed in parallel, while blocks that do depend on one another await the completion of code execution and data manipulation of the block on which they depend.

Dependencies are reflected as conceptual links between dependent blocks and the precursor blocks from which they depend. A dependent block is dependent on a precursor block when the dependent block needs the result of the precursor block in order for the dependent block to execute successfully. As will be shown below, dependency relationships may be viewed graphically using a directed acyclic graph ("DAG"). Nodes in the graph correspond to blocks of the memory region, and thus the program code and data assigned to the blocks.

During execution, the code associated with the blocks is queued for processing in a multiprocessor data processing system, for example, by placing block pointers in a queue. Each processor may further execute multiple threads that can individually process blocks. In one implementation, the blocks are queued according to the dependency information associated with each block. Additional information may also affect the ordering of blocks in the queue, including priority information, and the like.

The programmer may designate the number of threads available to process the blocks. For example, the programmer may designate two threads per processor. Each thread may, for example, maintain a program counter and temporary memory, as needed, to perform the code associated with the blocks.

Each thread, in turn, selects a block from the queue and executes the program code designated by the programmer for that block. As long as there are blocks in the queue, the threads, when available, select blocks and execute the associated program code. Threads select queued blocks for execution in a manner that reflects block dependency information. To that end, when an available thread selects a queued block for execution, the thread first examines the dependency information for that block. When the block or blocks from which the selected block depends have completed execution, then the thread can proceed to execute the program code for the selected block. Otherwise, the thread may enter a wait state until it can begin executing the program code for the selected block.

Alternatively, the thread may select the next available block in the queue, based on any priority if appropriate, and examine that block to determine its status with respect to any blocks upon which it depends. Processing continues until the threads have completed executing the program code associated with all blocks in the queue. Note that while the multiprocessor data processing system may exist as a single physical unit, that the threads may be distributed over multiple processors across multiple data processing systems, for example, across a LAN or WAN network.

The description below provides a detailed explanation of the methods, systems, and articles of manufacture consistent with the present invention.

At the beginning of the design and development process, a programmer specifies a memory region and divides the memory region into blocks using, for example, a graphical user interface component of the development tool. Below, the development tool will generally be described in the context of developing a data flow program for matrix manipulation. However, it is noted that the data element assigned to blocks may be scalars, structures, or any other type of data element.

Figure 2:
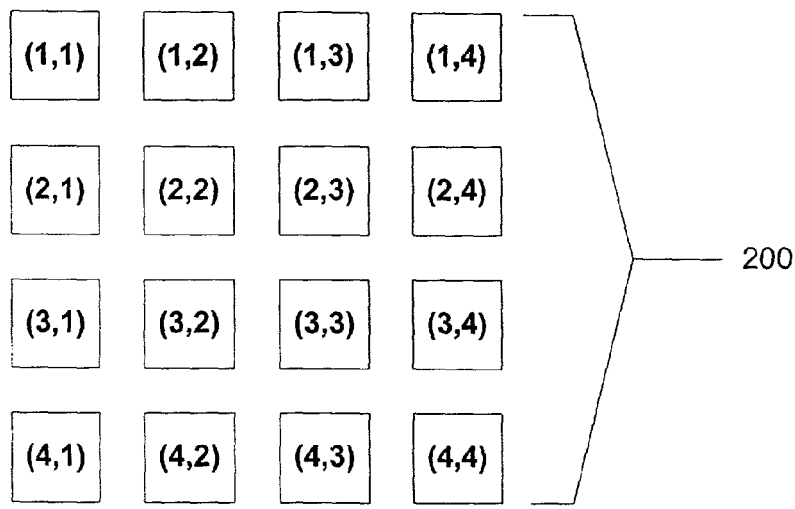
FIG. 2 depicts a block diagram illustrating an example of a memory region.
Figure 2:
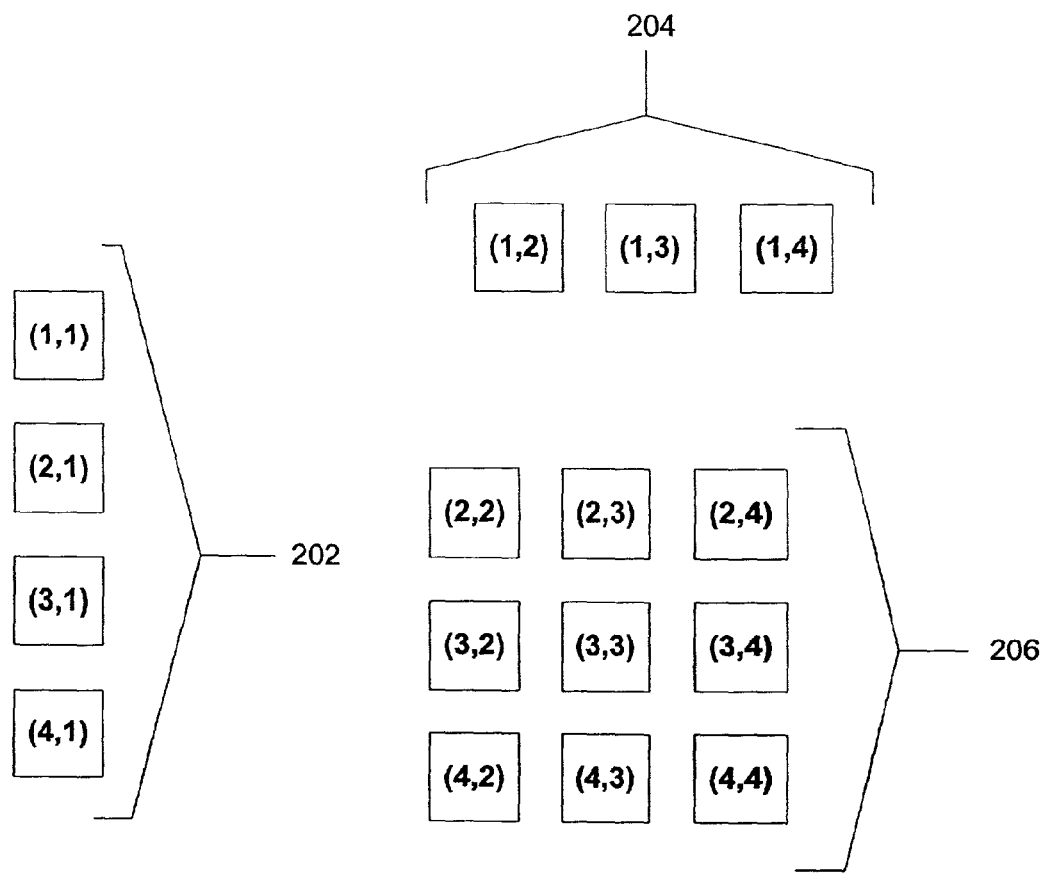

FIG. 2 shows an example of a memory region 200 that contains sixteen blocks arranged in a four-by-four matrix, with each block identified by a row number and column number. For example, the block in the upper left corner of memory region 200 is labeled (1,1) indicating that it is located in the first row and the first column, and the block in the lower right hand corner of region 200 is labeled (4,4) indicating that it is located in the lower right corner. Each block contains a data set, such as a matrix or array of values or information, to be processed in accordance with certain program code. As an example, the memory region 200 may represent a 100×100 matrix of scalars, with each block representing a 25×25 subarray of the larger matrix. Although the memory region 200 and the blocks are shown are regular squares, the scalars need not be located contiguously in memory. Rather, the development tool presents the memory region 200 and the blocks to the programmer as shown in FIG. 2 as a user friendly view of the data that the data flow program will work with.

After defining the memory region and dividing it into blocks, the programmer specifies a state for each block. The state of a block generally corresponds to the program code that the programmer assigns to that block. In other words, the assigned code is a portion of a program that the programmer intends to operate on the data in the block. The interface provides the programmer with a window or other input facility to provide the program code for a block and internally tracks the assignment of code to the blocks.

In the example region 200, the group of blocks 202 labeled (1,1), (2,1), (3,1), and (4,1) share a first state, the group of blocks 204 labeled (1,2), (1,3), and (1,4) share a second state, and the group of blocks 206 labeled (2,2), (2,3), (2,4), (3,2), (3,3), (3,4), (4,2), (4,3), and (4,4) share a third state. Although the region 200 and the blocks 202–206 are shown as being uniform in size, in practice a memory region and blocks may have different shapes and sizes, hold different types of data, and be distributed in memory contiguously or non-contiguously.

Figure 3A:
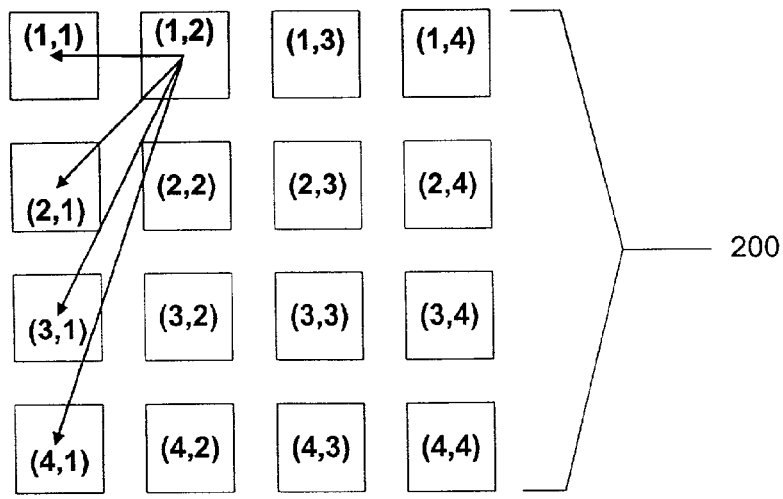
FIGS. 3A and 3B depict block diagrams illustrating an example of dependency relationships among the blocks of the memory region illustrated in FIG. 2.
Figure 3A:
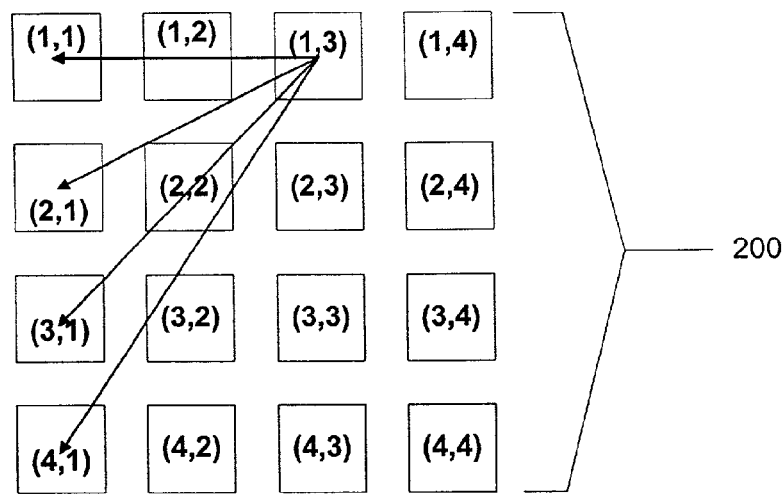
Figure 3A:
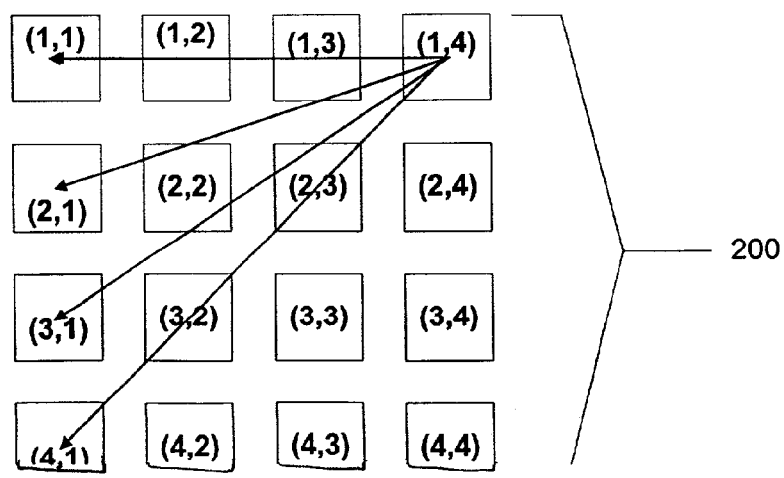
Figure 3B:
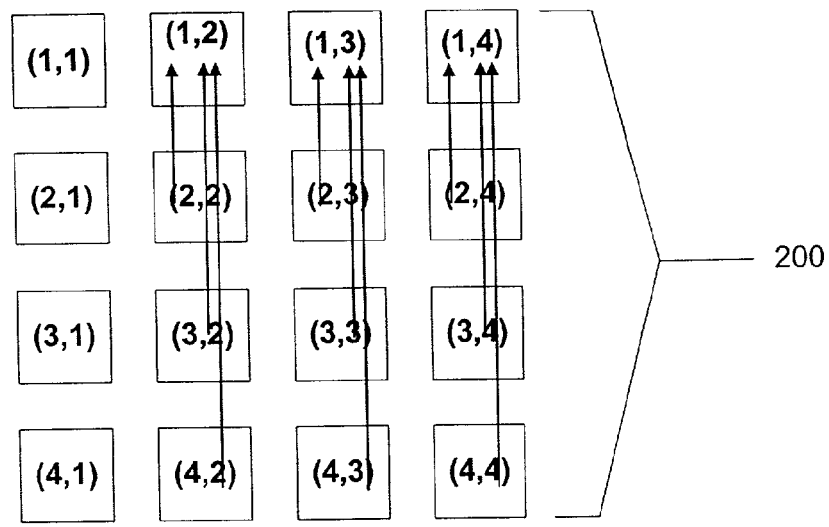

Next, the programmer specifies dependency relationships between the blocks. A dependency relationship exists when the code associated with a first block is dependent upon the result or final state of the data assigned to a second block. Thus, the code assigned to the first block needs to wait for execution of the code assigned to the second block. FIGS. 3A and 3B illustrate three examples of dependency relationships between blocks in the memory region 200 of FIG. 2. As shown in FIG. 3A, each of the blocks labeled (1,2), (1,3), and (1,4) are dependent on the blocks labeled (1,1), (2,1), (3,1), and (4,1). Thus, the blocks labeled (1,1), (2,1), (3,1), and (4,1) provide results needed by the blocks (1,2), (1,3), and (1,4).

Similarly, FIG. 3B illustrates dependencies among each of the blocks labeled (1,2), (1,3), and (1,4) and the blocks labeled (2,2), (2,3), (2,4), (3,2), (3,3), (3,4), (4,2), (4,3), and (4,4). As shown, the block labeled (1,2) is assigned data needed by the blocks in the same column labeled (2,2), (3,2), and (4,2); the block labeled (1,3) is assigned data needed the blocks in the same column labeled (2,3), (3,3), and (4,3); and the block labeled (1,4) is assigned data needed by the blocks in the same column labeled (2,4), (3,4), and (4,4). FIGS. 3A and 3B illustrate examples of dependencies for the memory region 200; a programmer may, of course, specify many other dependencies as necessary to reflect the data processing structure of a data flow program under development.

Note also that the development tool may also provide a dependency analysis component. The dependency analysis component examines program code to identify code that reads or writes specific data. Thus, the dependency analysis component may automatically insert dependencies between blocks when the programmer specifies the code to be assigned to each block. To that end, the development tool may build a separate step tree.

The step tree is a data structure that represents program execution as a series of steps. The programmer adds steps to the tree, and specifies to the development tool which data objects that particular step reads or writes. For example, the programmer may use data read and data write identifiers (e.g., pointers or handles) to specify the data. The programmer further specifies a code section executed at that step. As steps are added, the step tree grows and maintains the order of the steps, and thus the order and dependencies for data objects needed by the code sections associated with the steps. The development tool may then parse the step tree to automatically extract block dependencies.

Figure 4:
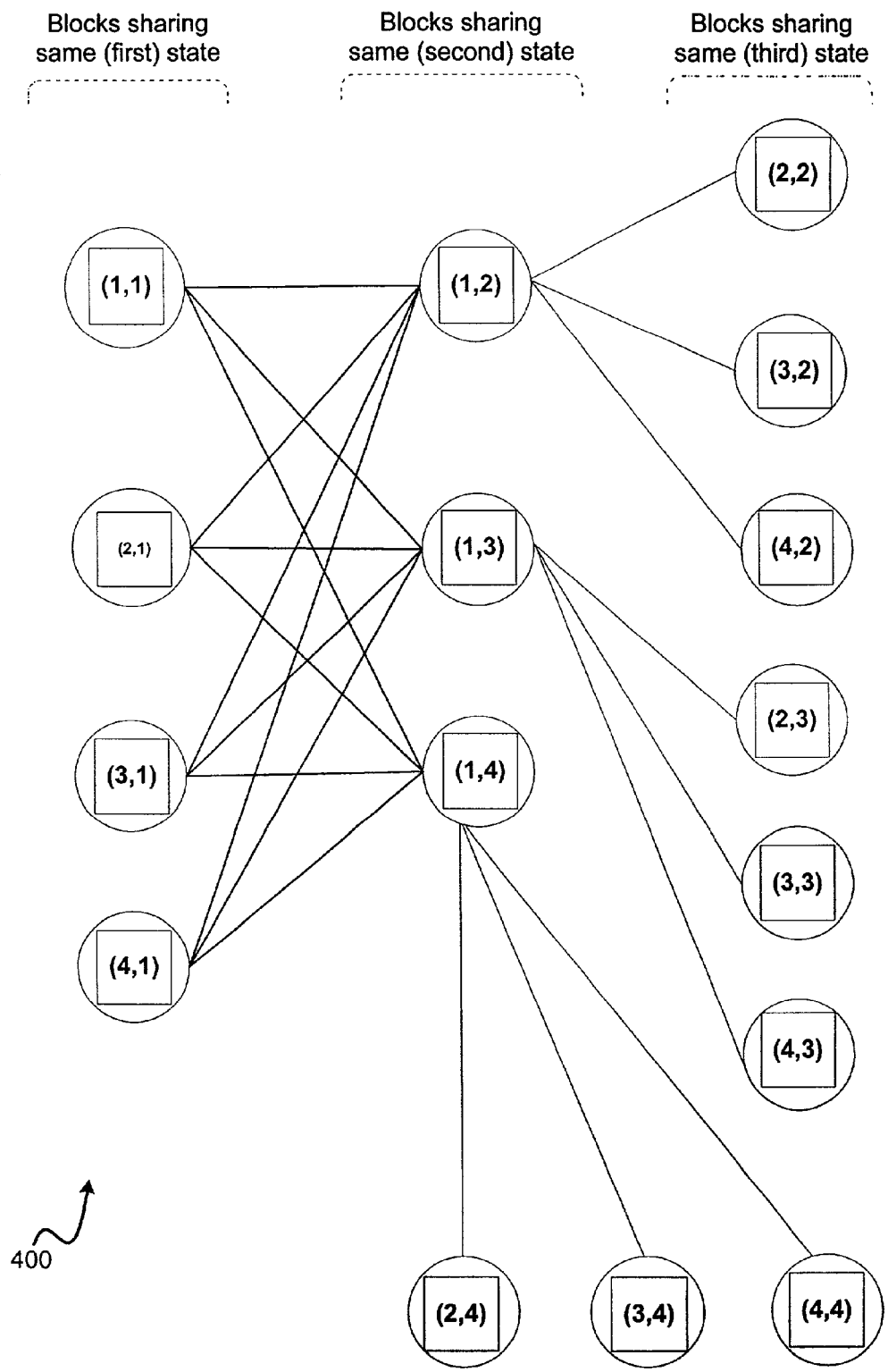
FIG. 4 depicts an example of a directed acyclic graph illustrating the dependency relationships shown in FIGS. 3A and 3B.

The development tool constructs a DAG using the dependency information. FIG. 4 presents an example of a DAG 400 illustrating the dependency relationships shown in FIGS. 3a and 3b. The DAG 400 illustrates graphically that the processed data associated with all of the blocks sharing the first state is needed by the code associated with the blocks sharing the second state. In turn, the processed data associated with the blocks sharing the second state is needed by particular blocks that share the third state. The development tool may use the DAG 400 to order the blocks for processing as explained below.

Figure 5:
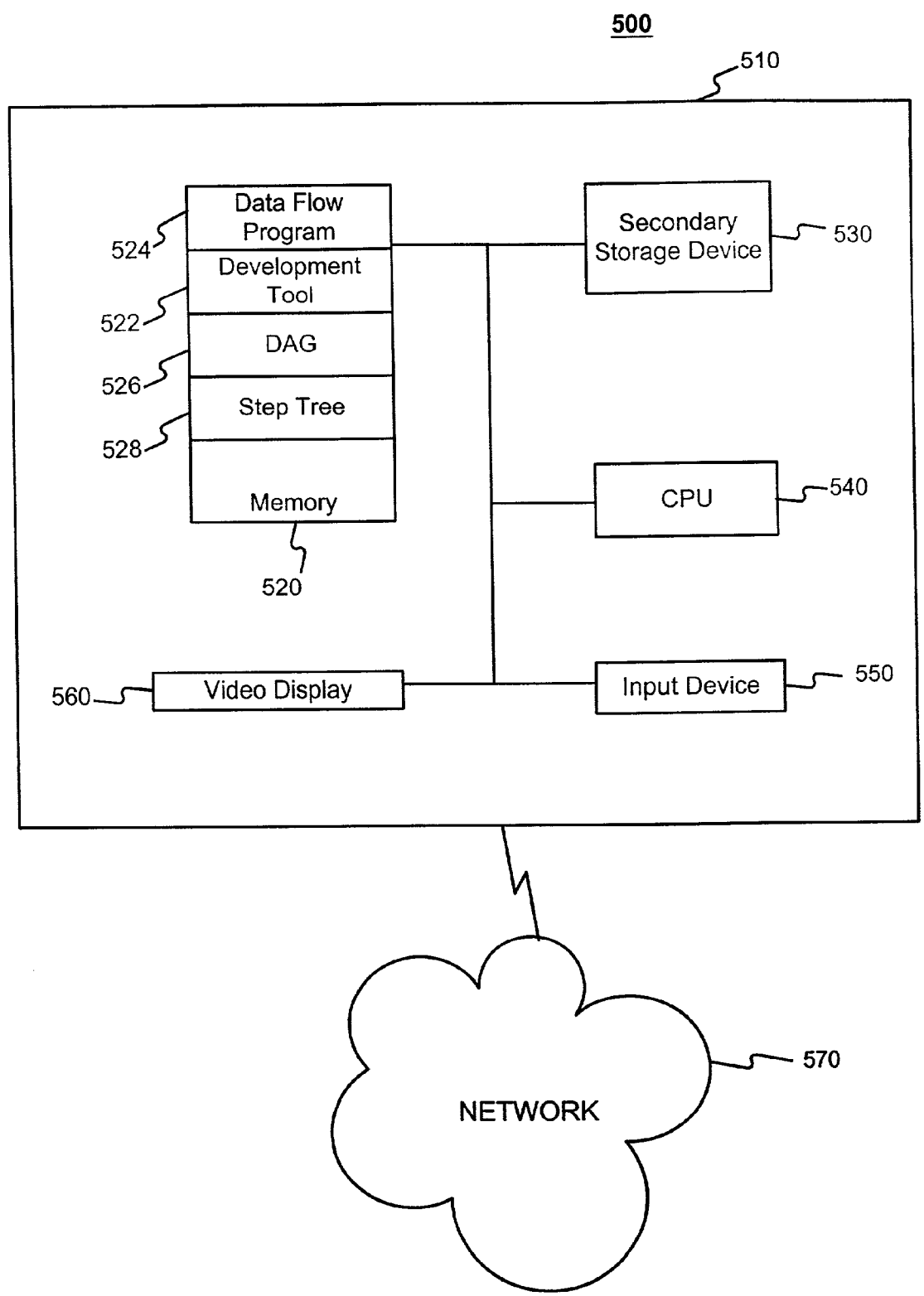
FIG. 5 depicts a block diagram of an exemplary data processing system suitable for use with methods and systems consistent with the present invention.

FIG. 5 depicts an exemplary data processing system 500 suitable for practicing methods and implementing systems consistent with the present invention. The data processing system 500 includes a computer system 510 connected to a network 570, such as a Local Area Network, Wide Area Network, or the Internet.

The computer system 510 includes a main memory 520, a secondary storage device 530, a central processing unit (CPU) 540, an input device 550, and a video display 560. The main memory 520 contains a data flow program development tool 522 and a data flow program 524. The memory also holds a data flow DAG 526 and a step tree 528. The data flow program development tool 522 provides the interface for designing and developing data flow programs, including programs that utilize control flow program code. Using display 560, the development tool 522 enables programmers to design memory regions, such as region 200 of FIG. 2, and divide the regions into blocks with corresponding states. The tool further enables programmers to write program code to operate on each of the blocks using a multiprocessor computer system (see FIG. 7).

The data flow program 524 represents a program designed in accordance with the data flow paradigm developed by the data flow tool 522. The data flow program 524 includes, for example, information specifying a memory region, the blocks of the region, the program code associated with each block, and dependency relationships between the blocks.

Although aspects of one implementation are depicted as being stored in memory 520, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM. Finally, although specific components of data processing system 500 have been described, one skilled in the art will appreciate that a data processing system suitable for use with methods and systems consistent with the present invention may contain additional or different components.

Figure 6:
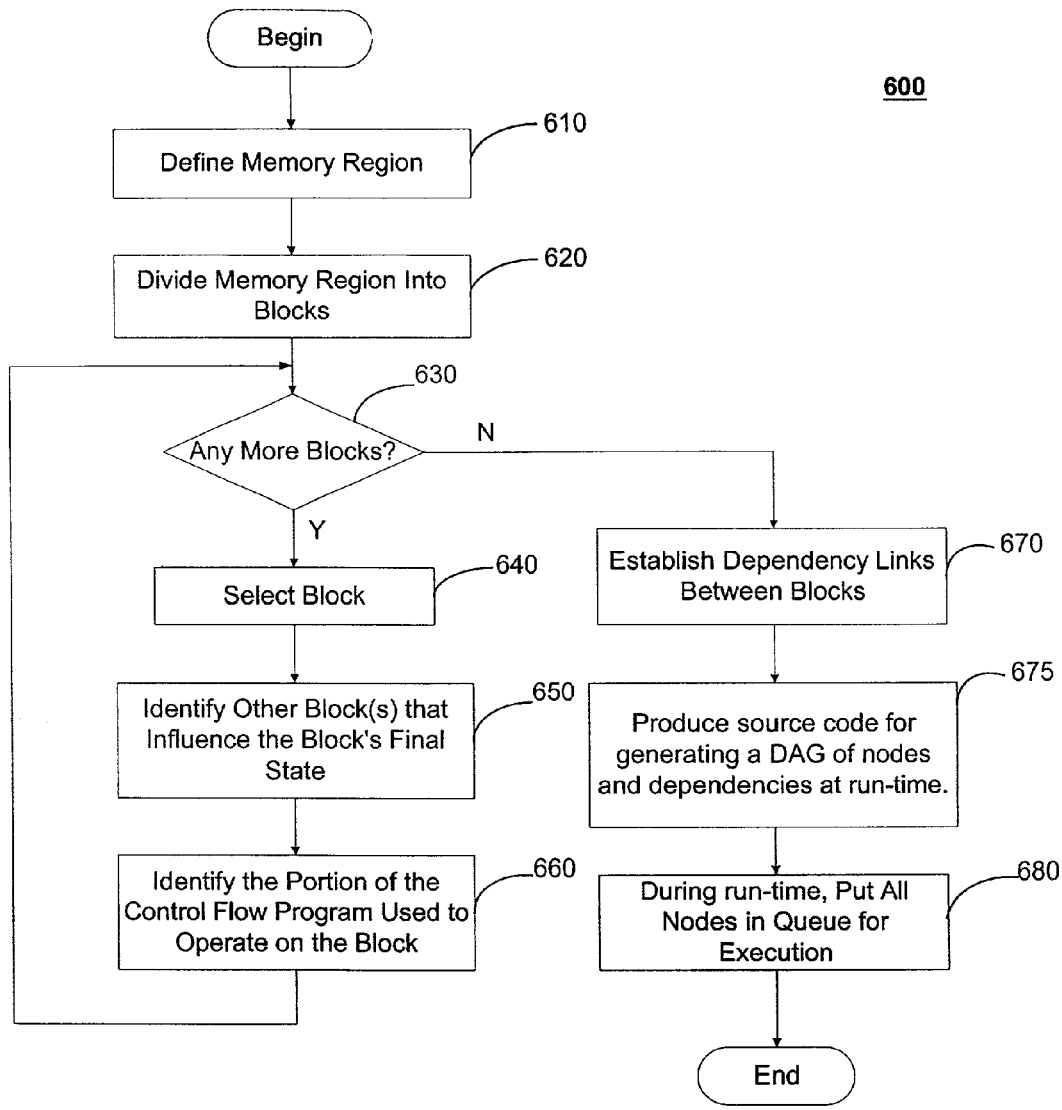
FIG. 6 depicts a flow chart of the steps performed by a data flow program development tool.

FIG. 6 is a flow chart of the process 600 performed by the development tool 522 interacting with programmers to construct data flow programs. After a programmer initiates execution of the development tool 522, the development tool 522 displays one or more windows that the programmer uses to construct a data flow program. First, the development tool 522 displays a window in which the programmer defines a memory region (step 610). The programmer uses the development tool 522 to divide the region into blocks (step 620).

As long as there are blocks in a region to be processed (step 630), the programmer selects a block (step 640), identifies any other block(s) that influence the selected block's final state (in other words, block(s) upon which the selected block is dependent) (step 650), and specifies the program code for each block, for example, a portion of an existing control flow program (step 660). In this manner, an existing control flow program may be converted to a data flow paradigm. Note, however, that the programmer may instead write new code for each block as part of the process of constructing a new data flow program.

After all of the blocks have been processed (steps 640 to 660), the programmer establishes the dependency relationships among the blocks by graphically linking them together (step 670). Alternatively or additionally, as explained above, the programmer may add steps to the step tree, and instruct the development tool 522 to automatically extract dependencies. In other words, with the steps described above, the development tool 522 first assists the programmer in defining a problem to be solved. Subsequently, the development tool 522 produces source files that can be compiled and run (step 675). The source files include code that (at run-time) produces in memory a DAG with the nodes and dependencies defined according to the steps set forth above. During run-time, the nodes are placed on a queue (step 680). The nodes thus form the basis for parallel execution.

The development tool 522 uses the dependency/link information to queue the blocks in a manner that reflects an acceptable order for processing. For example, a first block dependent upon a second block may be placed in the queue after the second block. For the example shown in FIGS. 2–4, the blocks may be queued in the manner shown in FIG. 7 with the blocks sharing the first state 202, (1,1), (2,1), (3,1), and (4,1), queued before the blocks with the second state 204, (1,2), (1,3), and (1,4), and followed by the blocks sharing the third state 206, (2,2), (2,3), (2,4), (3,2), (3,3), (3,4), (4,2), (4,3), and (4,4).

Figure 8:
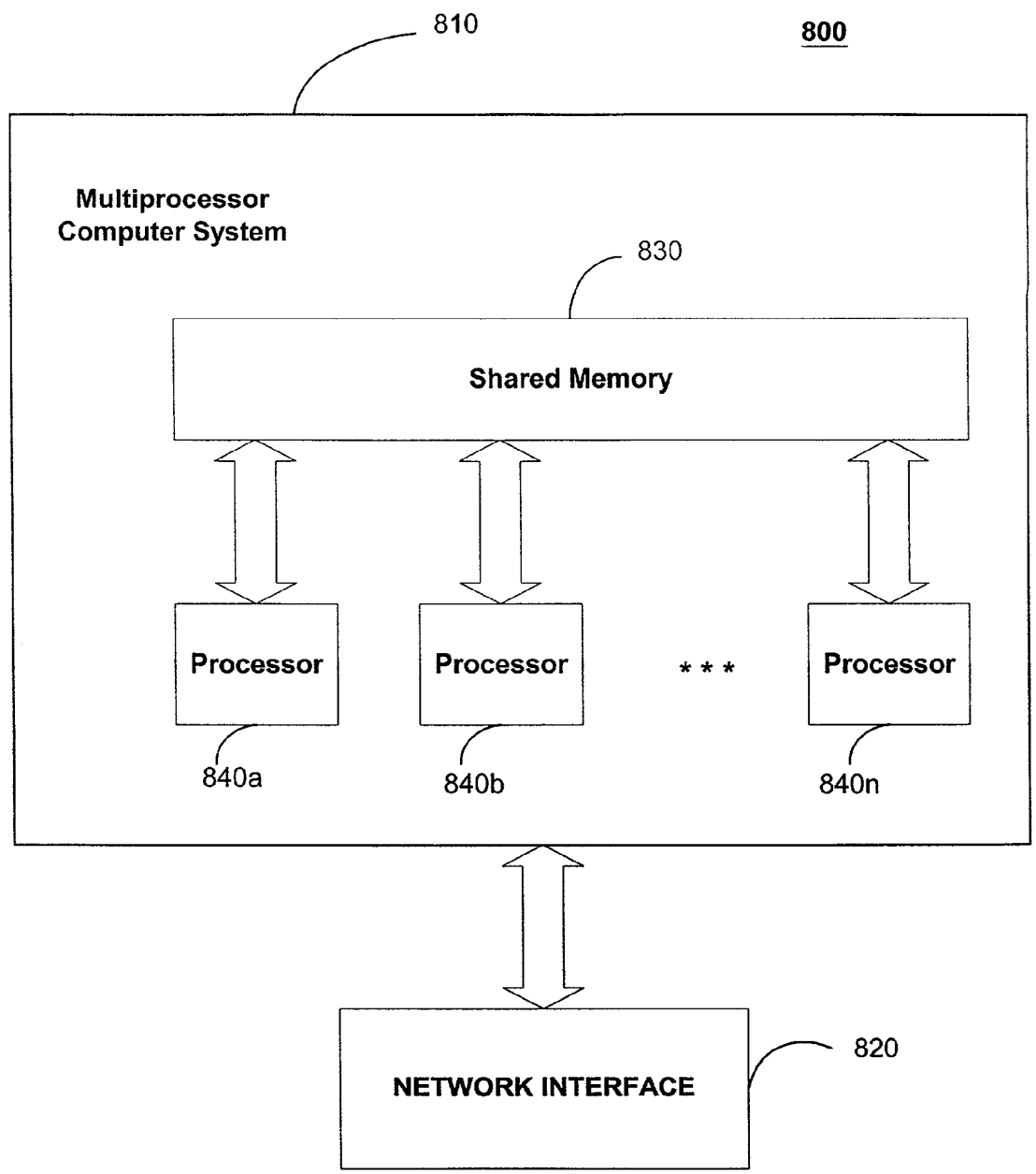
FIG. 8 depicts a block diagram of an exemplary multi-processor computer system suitable for use with methods and systems consistent with the present invention.

As noted above, the data flow program under development may be executed in a multiprocessor data processing system. The multiprocessor data processing system may take many forms, ranging from a single multiprocessor desktop computer to network distributed computer systems with many nodes. FIG. 8 illustrates one implementation of a multiprocessor data processing system 810.

The data processing system 810 includes a network interface 820 that allows a programmer to transfer the data flow program from the development tool environment (e.g., FIG. 5) for execution in multiprocessor computer system 810. Alternatively, the development tool 522 may execute on the same data processing system 810 on which the data flow program will execute.

The data processing system 810 includes, shared memory 830 and multiple processors 840a, 840b, . . . 840n. The number and type of processors may vary depending on the implementation. As one example, a Sun Microsystems HPC Server with a multiple processor configuration may be used as the data processing system. Processes execute independently on each of the processors in the data processing system 810. A process in this context may include threads controlling execution of program code associated with a block of a data flow program developed using tool 522.

Figure 9:
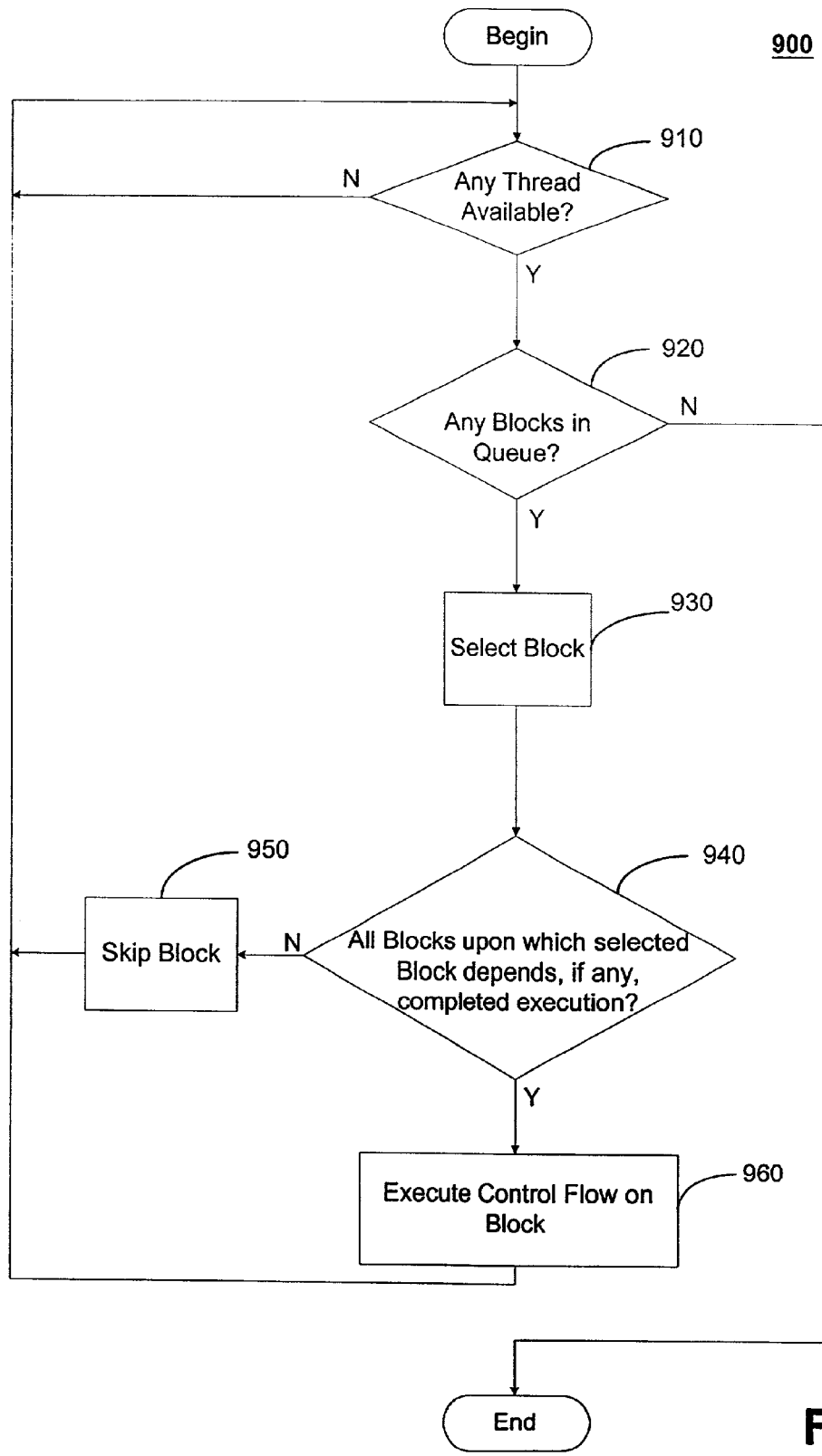
FIG. 9 depicts a flow chart of the steps performed during execution of a data flow program.

Turning next to FIG. 9, the operation of a data flow program in accordance with the present invention will now be described with reference to the process 900. Multiple threads are used to process the code associated with the blocks of the data flow program. The number of threads may vary depending on the implementation. As examples, the programmer may specify one thread per processor, or the data processing system 810 may determine the number of threads based on the number of available processors and an analysis of the data flow program.

If a thread is available to process the code associated with a block (step 910), the thread determines whether there are any blocks in the queue (step 920). If so, the available thread selects a block from the queue for processing (step 930). Typically, the blocks are selected from the queue based on the order in which they were placed in the queue. If, however, a thread determines that a selected block is dependent upon a block associated with code that has not yet been executed (step 940), the thread skips the selected block (step 950). Otherwise, when the block dependencies for the selected block have been satisfied (step 940), the thread uses an assigned processor to execute the program code associated with the selected block (step 960). Processing generally continues until the threads have executed the code associated with each block in the queue (step 920).

Figure 7:
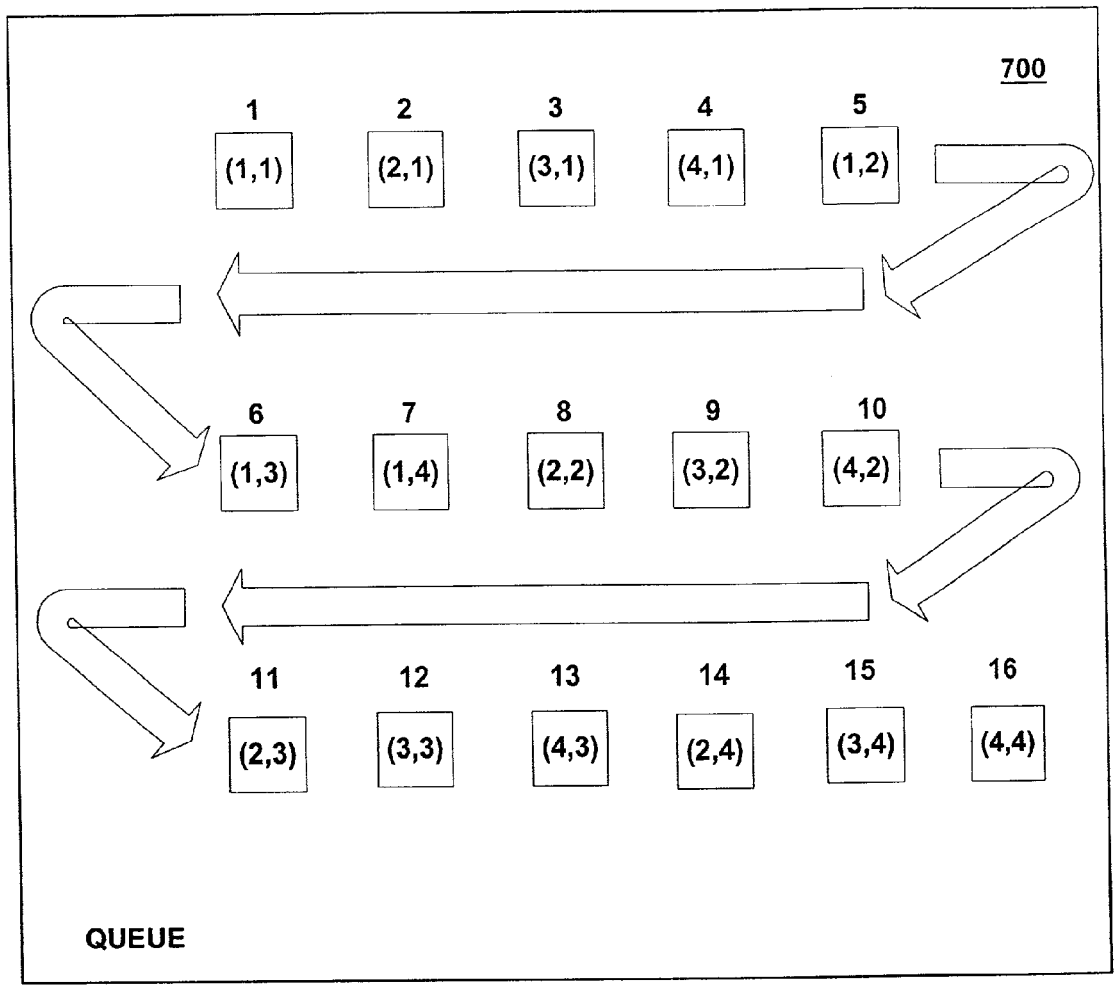
FIG. 7 depicts an example of a queue reflecting an order of execution of memory region blocks by a data flow program.
Figure 10A:
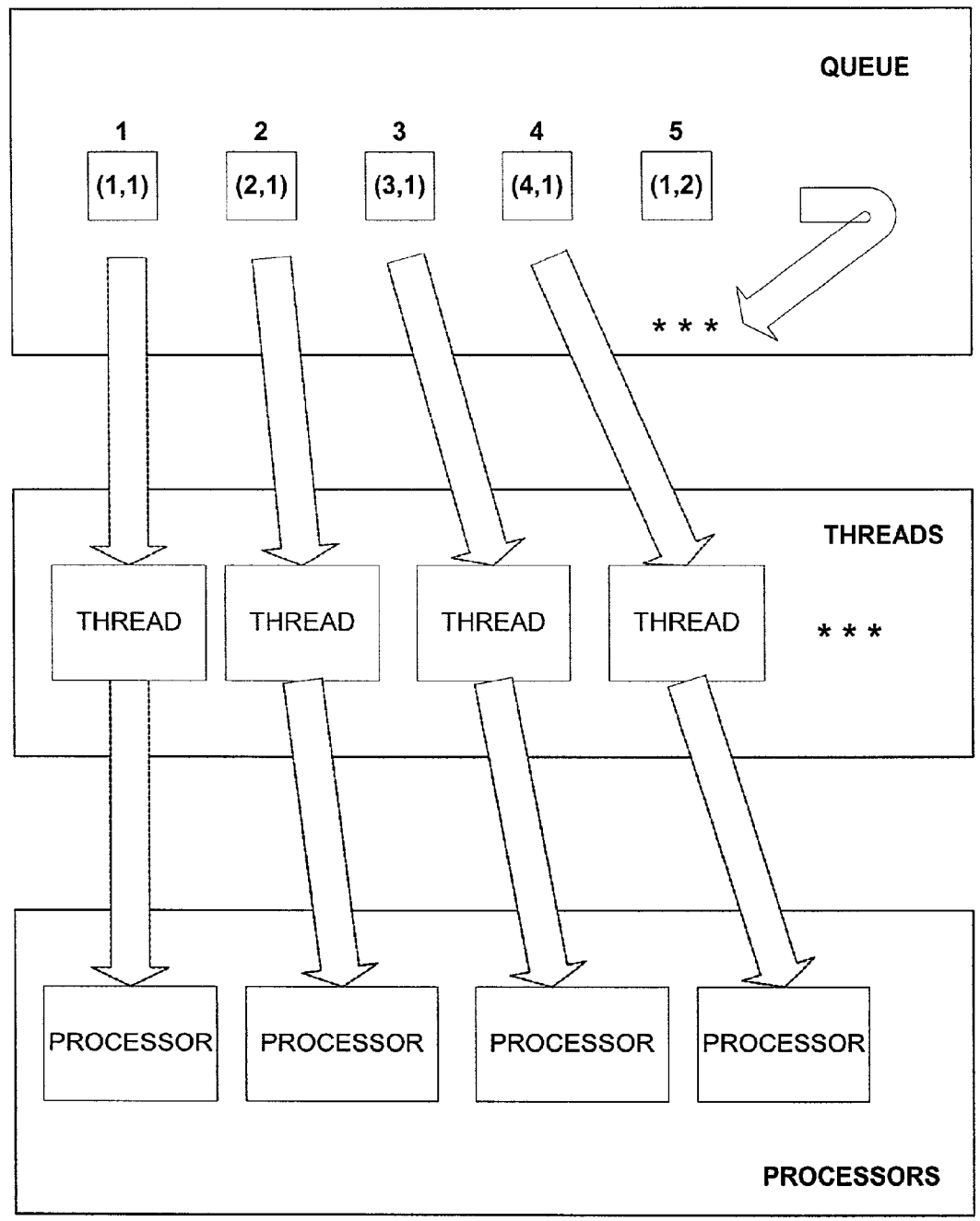
FIGS. 10A, 10B, and 10C depict block an execution cycle of a data flow program.
Figure 10B:
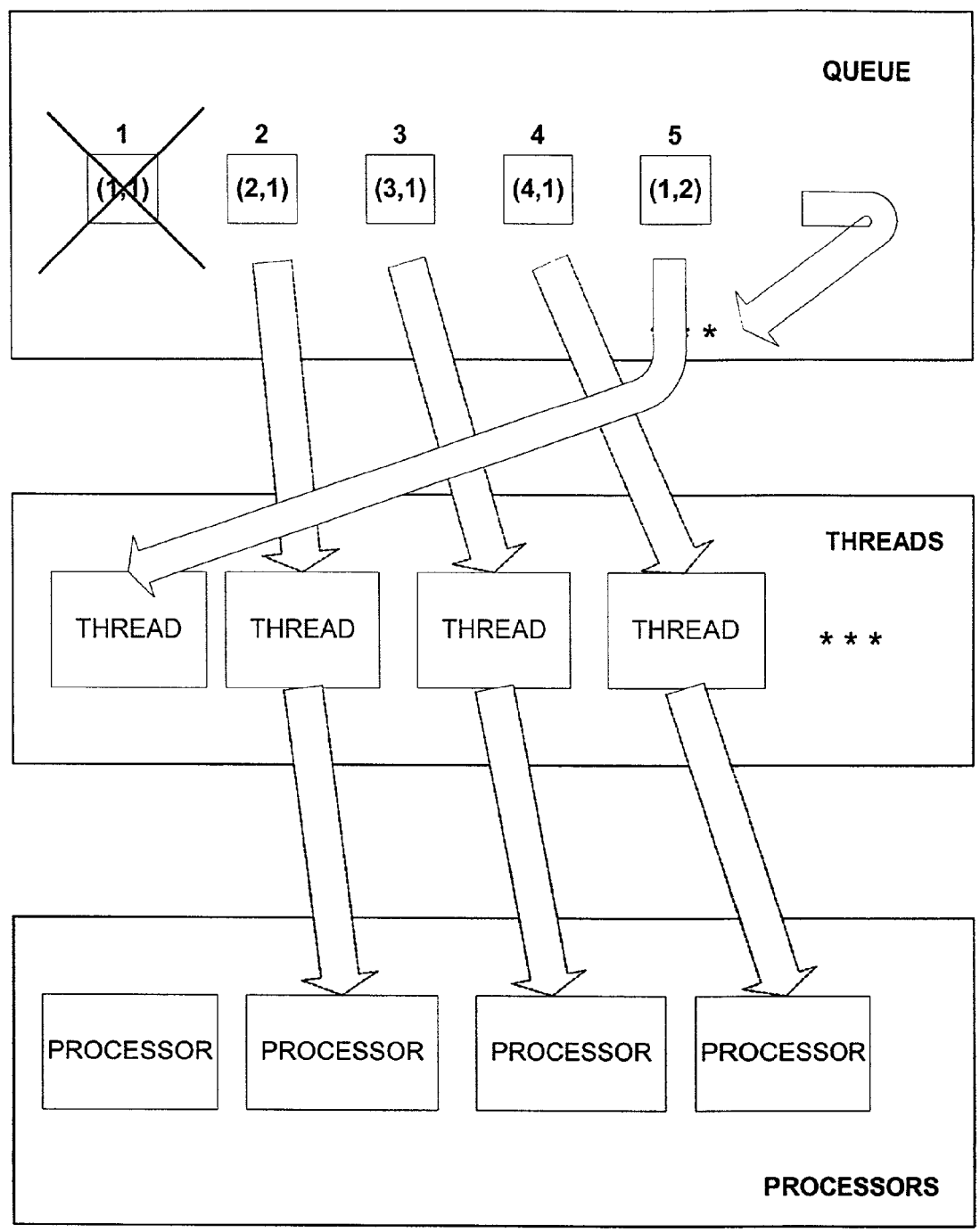

In a manner consistent with operation of the process 900, the FIGS. 10 a–c illustrate a portion of the queue of FIG. 7, including the first five blocks of the memory region 200 queued for processing. As shown in FIG. 10a, each thread processes a selected block using one of the processors. In this example, there are four threads and four processors. When a thread completes processing (shown for example in FIG. 10b where a thread completes program execution of the block labeled (1,1)), the thread attempts to execute the next available block in the queue, in this case, the block labeled (1,2). However, the thread does not proceed to execute because the block labeled (1,2) is dependent upon the final state of other blocks still being executed, namely, blocks (2,1), (3,1), and (4,1).

Figure 10C:
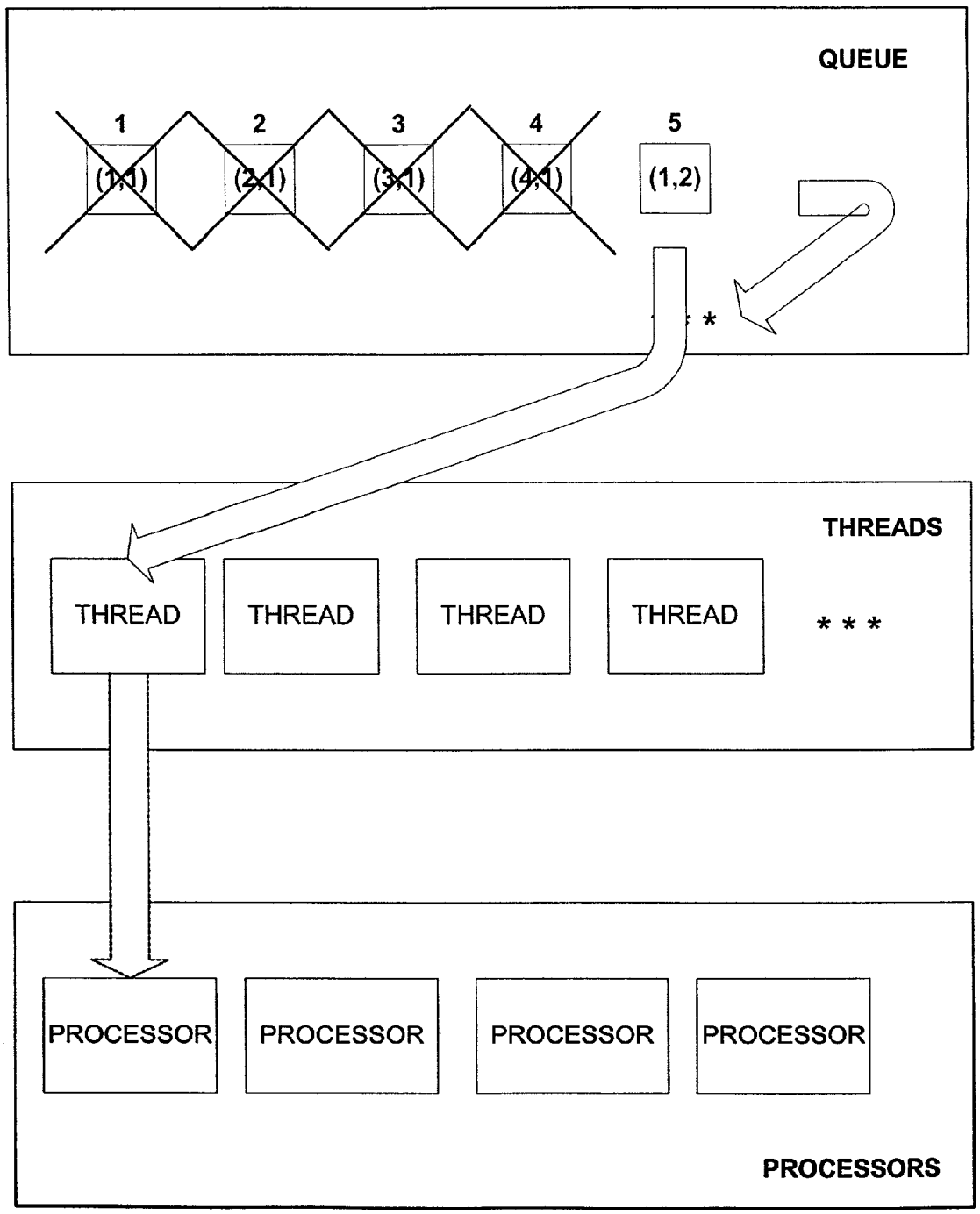

Once execution of the program code for the above-noted blocks has completed, as shown in FIG. 10c, a thread can continue processing with block (1,2). Instead of remaining idle, a thread may skip ahead to process other queued blocks when the dependency relationships for those queued blocks are met. Also, although FIG. 10 shows four threads and four processors, more or fewer threads or processors may be used depending upon the particular implementation.

The following description sets forth additional specifications the user may supply while developing a data flow program. In one implementation, the user may further specify the memory regions by inputting into the development tool 522 the following control flow variables and parameters:

Name: A unique name

Kind: Determines whether the memory region is an input to the problem, an output, input and output, or temporary space used only during evaluation of the problem.

Type: Corresponds to the data type of the elements of the memory region, for example, integer, real, and the like.

Dimensions: 0 for a scalar, 1 for a vector, 2 for a matrix. Higher dimensions may also be used.

Size: A size for each dimension of the memory region.

Grid: A size for each dimension of the blocks in a memory region.

Leading dimension: The size of the first dimension of matrices (when a memory region is larger than the matrix it holds).

In some applications under development, it may be useful for the program code that performs steps on the blocks to be able to access and manipulate the elements of a block. For example, when program code performs matrix manipulation operations, the program code may benefit from information concerning the matrices or sub-matrices stored in one or more blocks. Macros allow the programmer to write program code that will perform operations on the blocks at each node in the DAG. The macros access specific elements and attributes of a block in a memory region. Taking a block in a memory region as an argument, the macro may return for instance, the number of rows or columns in the block, or the number of rows or columns in the memory region. The following table lists several exemplary macros that the programmer may apply in program code and that will act on a block in a memory region:

| Macro | Description |
|---|---|
| #AROW(OBJ) | evaluates to the absolute row of the first element in the block, the true index |
| #ACOL(OBJ) | evaluates to the absolute column of the first element in the block |
| #NROWS(OBJ) | the number of rows in the block |
| #NCOLS(OBJ) | the number of columns in the block |
| #ANROWS(OBJ) | the number of rows of elements in the memory region |
| #ANCOLS(OBJ) | the number of columns of elements in the memory region |
| #GROWS(OBJ) | the number of rows of elements per block |
| #GCOLS(OBJ) | the number of columns of elements per block |
| #RECROW (OBJ,INDEX) | Converts INDEX, and absolute index based on the current level of recursion and converts it to a true absolute index |
| #RECCOL (OBJ,INDEX) | Converts INDEX, and absolute index based on the current level of recursion and converts it to a true absolute index |

Figure 11:
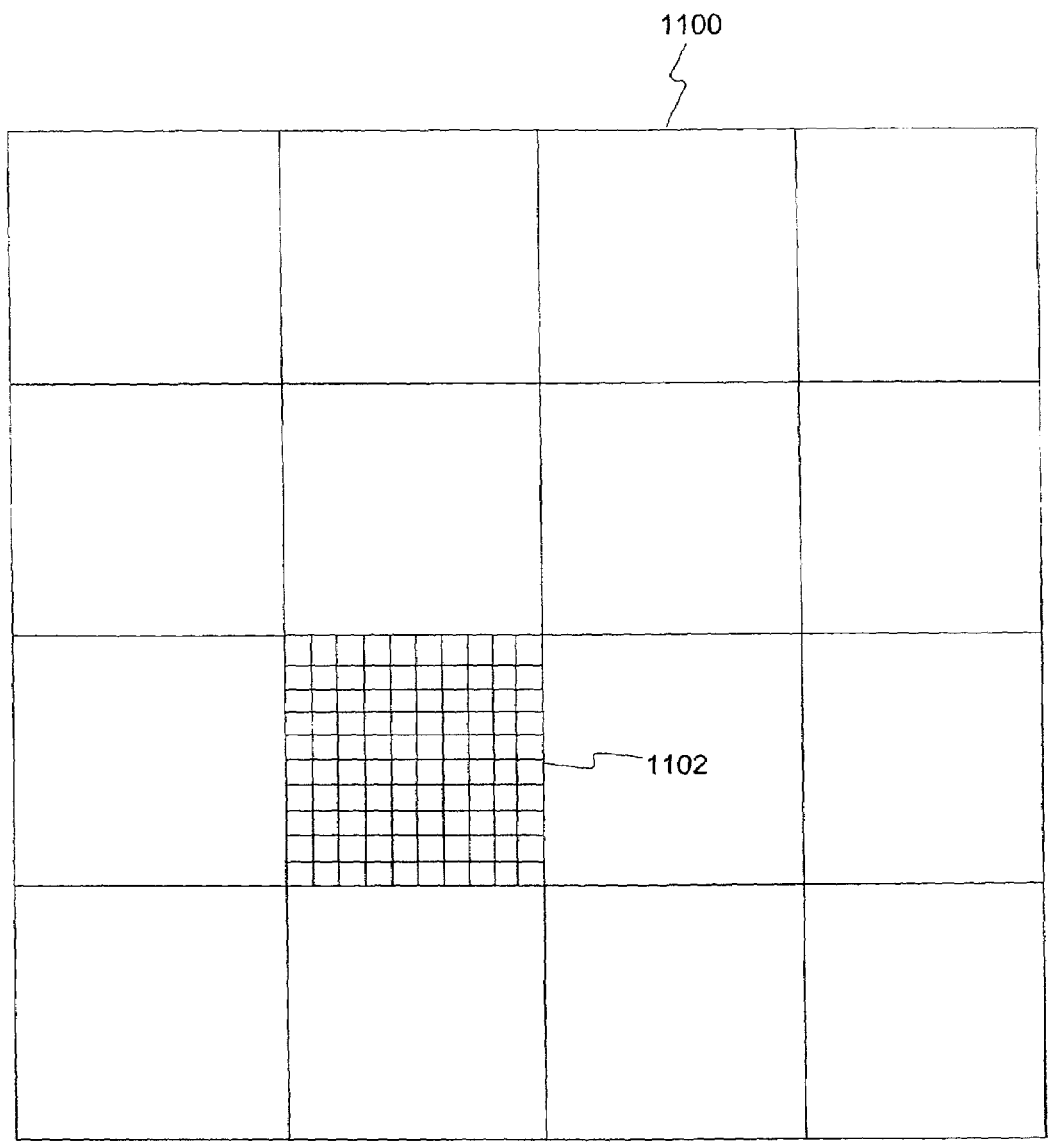
FIG. 11 is an exemplary memory region containing a block with an array of elements.

FIG. 11 shows an exemplary memory region 1100 with blocks having elements arranged in a 10×10 fashion. Given this memory region 1100 with a block 1102 located as shown on the figure, the following macros evaluate for this block 1102 as shown in the following table:

| Macro | Value |
|---|---|
| #ROW(A) | 3 |
| #COL(A) | 2 |
| #AROW(A) | 21 |
| #ACOL(A) | 11 |
| #NROWS(A) | 10 |
| #NCOLS(A) | 10 |
| #ANROWS(A) | 40 |
| #ANCOLS(A) | 40 |
| #GROWS(A) | 10 |
| #GCOLS(A) | 10 |

It should be noted that recursive program codes may be used in which the process repeatedly applies over a smaller region. In this case, the recursion stops when a base case is reached and the region becomes so small that there is not enough left to repeat the process. Specific program code can be associated with a recursive process that will only be executed for the base case. For example, assume that a recursive process is defined that moves over one block column and down one block row at each level of recursion. The following recursive macros evaluate at each level as shown in the following table:

| Macro | Recursive Level | | |
|---|---|---|---|
| | Level 1 | Level 2 | Level 3 |
| #RECROW(A,1) | 1 | 11 | 21 |
| #RECCOL(A,6) | 6 | 16 | 26 |

Additionally, the programmer may designate program code as sub-DAG program code. The sub-DAG designation instructs the development tool 522 to build a sub-DAG for the code associated with a particular node. In other words, any node in a DAG have, underlying, another DAG specifically directed to the code associated with that node. Thus, the programmer may develop parallelism across a whole application, or inside smaller pieces of code. The programmer may view the resulting hierarchy of DAGs by inputting to the development tool 522 one or more DAGs that the development tool 522 should display.

As stated previously, dependencies are specified manually or automatically between blocks and denote which blocks need to be executed before other blocks. The dependencies, in turn, determine the connections between nodes in a DAG representing execution order. Often, several blocks in a memory region depend on several other blocks in the same memory region. Although in most instances automatic specification of dependencies (using the step tree explained above) is suitable, the development tool 522 further provides an input option that a programmer may use to quickly denote dependencies between multiple blocks.

Figure 12A:
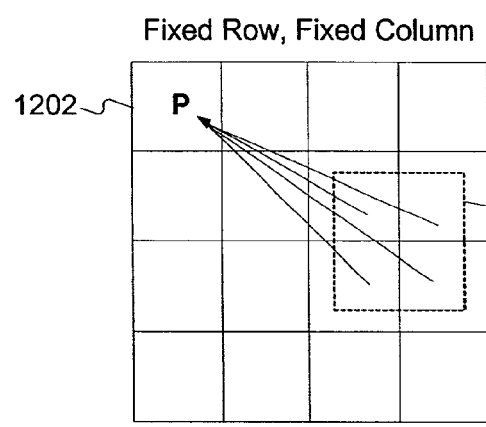
FIGS. 12A, 12B, 12C, and 12D illustrate the creation of dependencies between blocks.

FIG. 12A, for example, shows a programmer denoting a parent block 1202 for a set of blocks 1204 (or state) using a development tool 522 user interface (e.g., responsive to mouse and keyboard input). In this implementation, the parent block 1202 represents the starting upper left corner of a set of parent blocks to be designated. Then the programmer specifies whether the dependency on the parent block 1202 is fixed or free with respect to row and column.

Figure 12B:
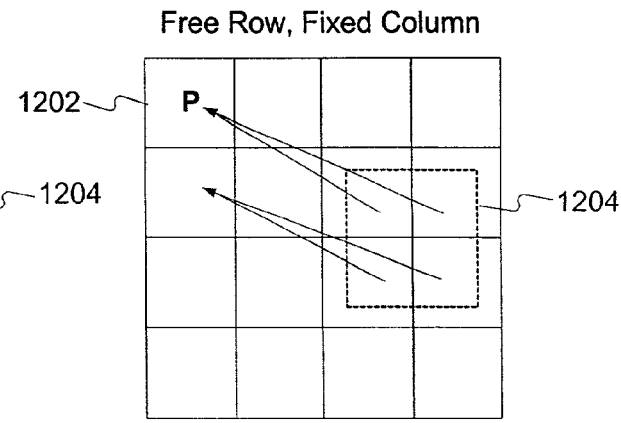
Figure 12C:
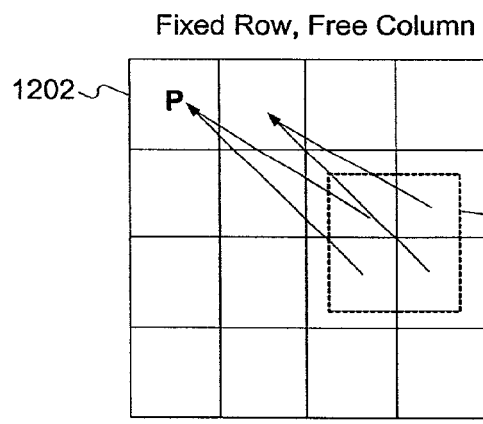
Figure 12D:
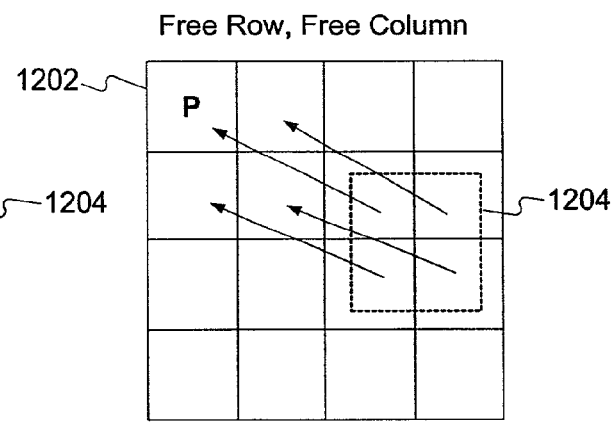

FIGS. 12B–D illustrate different combinations of fixed and free designations given an exemplary dependent set of blocks 1204. If the programmer designates the dependency as fixed, all blocks in the dependent set of blocks 1204 depend on the processing of the parent block 1202 (FIG. 12A). If the dependency is free with respect to row, the block that is depended on varies as row location in the dependent set of blocks 1204 varies (from the upper left block) (FIG. 12B). Similarly, if the dependency is free with respect to column, the block that is depended on varies as column location in the dependent set of blocks 1204 varies (from the upper left block) (FIG. 12C). If the dependency is free with respect to row and column, the block that is depended on varies as location in the dependent set of blocks varies (FIG. 12D). Through this method of designating dependencies, the development tool 522 allows a programmer to quickly manually designate multiple block dependencies.

For the purposes of assigning blocks to nodes in a DAG, the development tool 522 may provide either or both of a "distribution" mechanism and a "movement" mechanism. With regard first to "distributions", the development tool 522 permits the programmer to assign certain types of "distributions" to sets of blocks in a memory region. The distributions then control the manner in which blocks are assigned to nodes in a DAG. The distributions may be used to flexibly group different blocks into a single node and consequently allow different parallel processing approaches to be used for execution of a problem.

For example, given that the result of a 3×3 matrix multiply problem is a 3×3 matrix, the programmer may first select 9 threads to operate on 9 nodes, one for each value in the resulting matrix. However, the programmer, as an alternate approach, may select 3 threads to process 3 nodes, one for each column in the resulting matrix. In the alternate approach, a node will contain more blocks but the data flow program will use less threads. The varying distributions give the programmer flexibility in testing different parallel processing techniques.

To designate a distribution, the programmer selects a rectangular area of the memory region to identify a set of blocks. In addition to determining the allocation of blocks to nodes, the distributions optionally control which blocks macros operate on . To this end, the development tool 522 may support two main categories of distributions: primary and secondary. The difference between primary and secondary distributions is that the development tool 522 may, if selected by the programmer, restrict macros to operate on blocks in primary distributions but not on blocks in secondary distributions. The primary distribution generally determines how many nodes there will be in the DAG for data flow program under development. For a set of blocks that the programmer designates as a secondary distributions, the development tool adds each block in the set of blocks to the same node of the DAG.

Distributions may be categorized as "primary single", "secondary multiple row," "secondary multiple column," "secondary all," and "multiple" (either primary or secondary). Primary single distributions control how many DAG nodes are created. If a primary single distribution is present in a memory region, the development tool 522 will create one DAG node for each block in the distribution. Each block in a primary single distribution will enter its own node; no two blocks of a given primary single distribution will share the same node. The development tool 522 will also assign each block in additional primary single distributions (e.g., in additional memory regions) to the nodes in the DAG as well.

For all other types of distributions, the development tool 522 determines which block in the additional distribution is added to a DAG node through a process that can be conceptualized as visually placing the additional distribution over the primary single distribution. The block in the additional distribution that is in place over a primary single distribution block is added to the node containing that primary single distribution block.

Secondary distributions include secondary multiple row, secondary multiple column, and secondary all distributions. When a block in a secondary multiple row distribution is added to a node, then all of the blocks in the row of that block are also added to the node. Similarly, for secondary multiple column distributions, the each block in the column is added. In secondary all distributions, when a block in the distribution is added to a node, every block in the distribution is added to the node.

Multiple distributions may be primary or secondary. If the primary single distribution is larger than the multiple distribution, then blocks from the multiple distribution are added to nodes in a process that may be conceptualized as iteratively placing the multiple distribution over the primary distribution and shifting until the multiple distribution has covered the whole primary distribution. At each iteration, a multiple distribution block that is over a primary distribution block is entered into the same node containing the primary distribution block.

Distributions may also have a transpose attribute. The transpose attribute indicates that the distribution is transposed before the overlaying process is applied.

Figure 13:
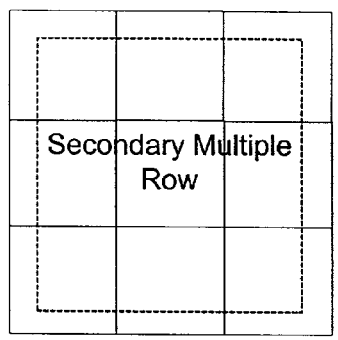
FIGS. 13–15 each shows three exemplary memory regions having blocks assigned to distribution groups.
Figure 13:
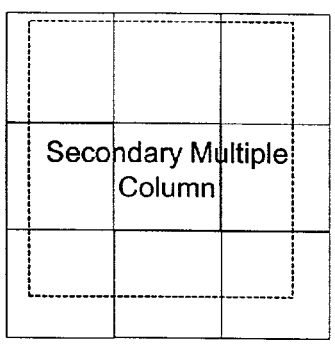
Figure 13:
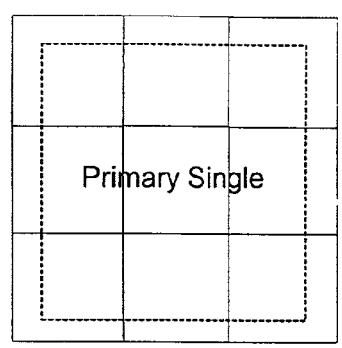

FIG. 13 shows exemplary memory regions used in a matrix multiplication problem involving three 2-dimensional memory regions, A, B, and C. Assume that each memory region has row and column sizes such that the memory regions are divided into square blocks as shown in FIG. 13. The operation A*B=C can be performed in parallel using several different approaches. First, consider an approach in which each block of C is written by a different thread. A block in C is formed by multiplying the blocks in the corresponding row of A by the corresponding column of blocks in B. In this example, the dashed lines represent the distributions created by the user.

For the 3×3 case depicted in FIG. 13, since C has a primary single distribution, the development tool 522 establishes a node in a DAG for each of the nine blocks. In response to the secondary multiple row distribution on A and the multiple column distribution on B, the development tool 522 adds the rows of A and columns of B to nodes as explained above. For example, when the C(1,1) block is added to the node, the A(1,1) and B(1,1) blocks are also added. Because the A(1,1) block is in a secondary multiple row distribution, all of the blocks in that row are also added to the same node. Similarly, because the B(1,1) block is in a secondary multiple column distribution, all of the blocks in that column are added to the same node.

The resulting nodes that the development tool 522 creates are shown in the table below. In the table, the ordered pair specifies the row and column of each block added, and the hyphen ("-") specifies a range of rows or columns when more than one block is added from a distribution.

| Node | Blocks Added |
| --- | --- |
| Node 1 | C(1,1), A(1,1–3), B(1–3,1) |
| Node 2 | C(1,2), A(1,1–3), B(1–3,2) |
| Node 3 | C(1,3), A(1,1–3), B(1–3,3) |
| Node 4 | C(2,1), A(2,1–3), B(1–3,1) |
| Node 5 | C(2,2), A(2,1–3), B(1–3,2) |
| Node 6 | C(2,3), A(2,1–3), B(1–3,3) |
| Node 7 | C(3,1), A(3,1–3), B(1–3,1) |
| Node 8 | C(3,2), A(3,1–3), B(1–3,2) |
| Node 9 | C(3,3), A(3,1–3), B(1–3,3) |

Figure 14:
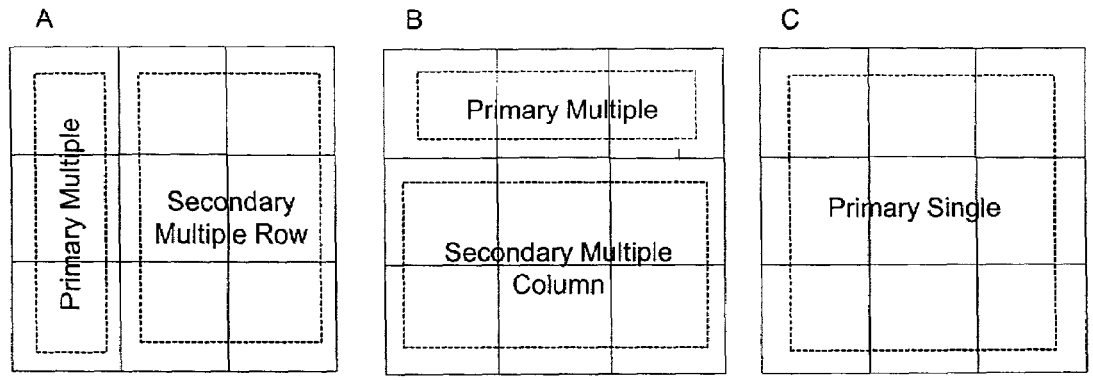

FIG. 14 shows primary A and B distributions created for the same matrix multiply problem. The distributions shown in FIG. 14 result in the following 9 nodes:

| Node | Blocks Added |
| --- | --- |
| Node 1 | C(1,1), A(1,1), B(1,1), A(1,2–3), B(2–3,1) |
| Node 2 | C(1,2), A(1,1), B(1,2), A(1,2–3), B(2–3,2) |
| Node 3 | C(1,3), A(1,1), B(1,3), A(1,2–3), B(2–3,3) |
| Node 4 | C(2,1), A(2,1), B(1,1), A(2,2–3), B(2–3,1) |
| Node 5 | C(2,2), A(2,1), B(1,2), A(2,2–3), B(2–3,2) |
| Node 6 | C(2,3), A(2,1), B(1,3), A(2,2–3), B(2–3,3) |
| Node 7 | C(3,1), A(3,1), B(1,1), A(3,2–3), B(2–3,1) |
| Node 8 | C(3,2), A(3,1), B(1,2), A(3,2–3), B(2–3,2) |
| Node 9 | C(3,3), A(3,1), B(1,3), A(3,2–3), B(2–3,3) |

As an example, the program code that executes on each node may be represented by a FORTRAN function, MATRIX_MULTIPLY, that takes as arguments the location, number of rows, and number of columns of the three matrices A, B, and C, respectively.

```
    CALL MATRIX_MULTIPLY
        (A(#AROW(A),1),#NROWS(A),#ANCOLS(A),
$           B(1,#ACOL(B)),#ANROWS(B),#NCOLS(B),
$           C(#AROW(C),#ACOL(C)),#NROWS(C),#NCOLS(C))
```

Figure 15A:
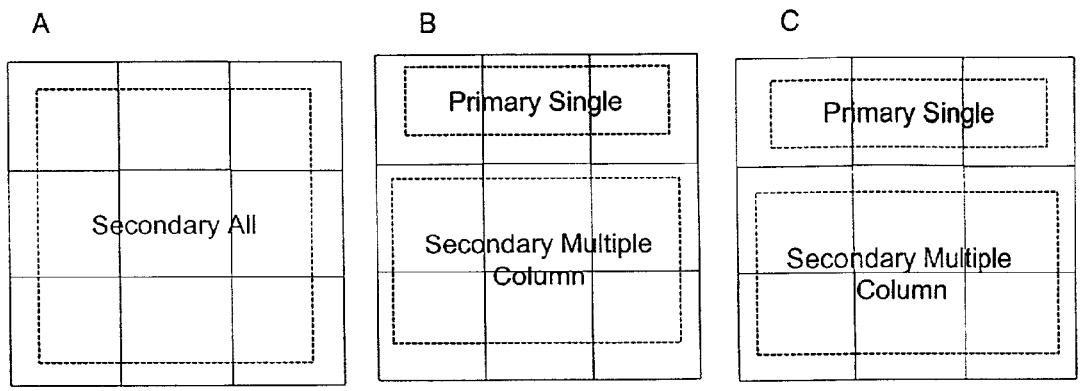

FIG. 15A shows another allocation of distributions for the matrix multiplication problem in which the programmer has determined that each thread will process a column of blocks in C. In this case, the development tool 522 creates three nodes because there are three blocks in the primary single distribution. As explained above, when the multiple column distributions are laid over the primary single distribution, each block over a primary single distribution block is added to the same node as that primary distribution block, along with the additional block in the same column of the multiple column distribution. In the example shown in FIG. 15, for example, the block B(2,1) of the secondary multiple column distribution of B is conceptually positioned over C(1,1). Thus, the development tool 522 adds the block B(2,1) to the node containing C(1,1). Furthermore, because block B(2,1) is part of a multiple column distribution, the block B(2,2) in the same column as B(2,1) is also added to the node containing C(1,1). Also note that when the development tool 522 adds a block from A to a node, all blocks from A are added to that node because all the blocks of A are designated as a secondary all distribution.

| Node | Blocks Added |
| --- | --- |
| Node 1 | C(1,1), B(1,1), A(1–3,1–3), C(2–3,1), B(2–3,1) |
| Node 2 | C(1,2), B(1,2), A(1–3,1–3), C(2–3,2), B(2–3,2) |
| Node 3 | C(1,3), B(1,3), A(1–3,1–3), C(2–3,3), B(2–3,3) |

The following program code may be used to execute the multiplication:

```
    CALL MATRIX_MULTIPLY      (A(1,1),#ANROWS(A),#ANCOLS(A),
$           B(1,#ACOL(B)),#ANROWS(B),#NCOLS(B),
$           C(1,#ACOL(C),#ANROWS(C),#NCOLS(C))
```

Figure 15B:
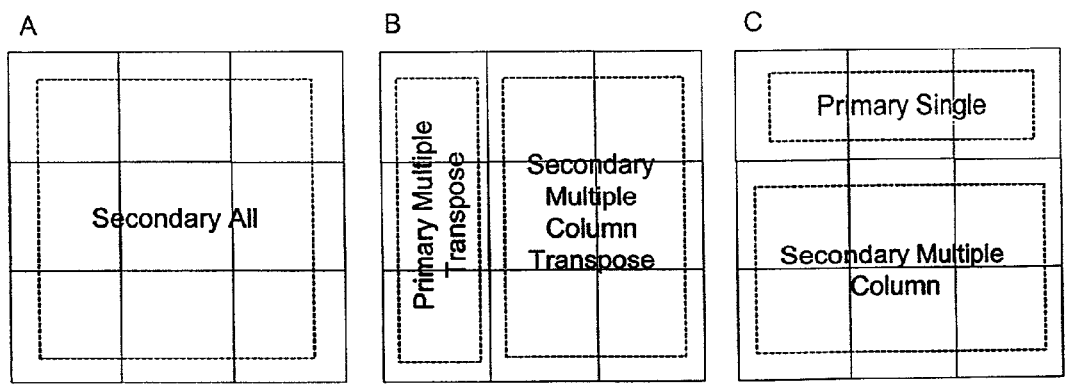

FIG. 15B shows another example where the transpose of B is to be multiplied by A to form C. The transpose attribute explained above allows several of the allocations from the previous example to be reused, with modifications to the memory area B as shown in FIG. 15B.

Figure 16:
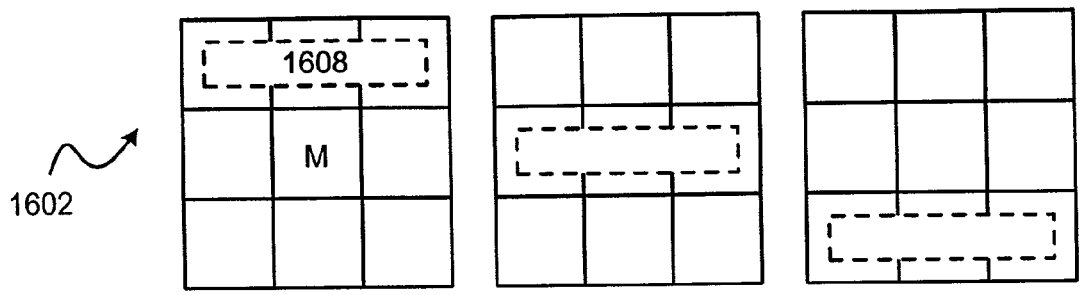
FIG. 16 illustrates a movement technique for assigning blocks to nodes.
Figure 16:
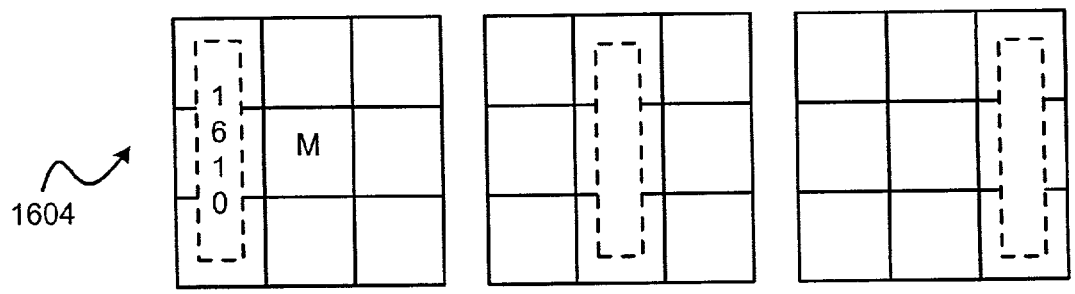
Figure 16:
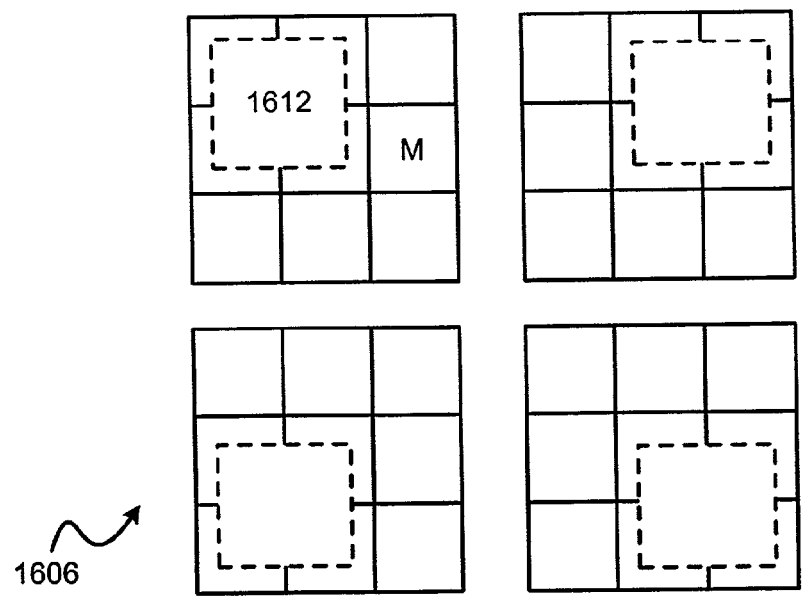

As noted above, the development tool 522 also supports a "movement" mechanism for adding blocks in a memory area to nodes in a DAG. Turning next to FIG. 16, that figure shows three examples of the movement mechanism on a memory area M: a row movement 1602, a column movement 1604, and a combination movement 1606.

With regard to the row movement 1608, the programmer first draws (or specifies using another input mechanism such as a keyboard) the selection 1608 shown in FIG. 16. The development tool 522 then moves the selection 1608 across the memory area M until the leading edge of the selection 1608 hits a boundary of the memory area. At each position, the development tool 522 adds the blocks covered by the selection 1608 to a node in the DAG. Thus, for the row movement 1608, the development tool 522 adds three nodes to the DAG.

Similarly, with regard to the column movement 1604, the programmer first draws the selection 1610 shown in FIG. 16. The development tool 522 then moves the selection 1610 across the memory area M until the leading edge of the selection 1608 hits a boundary of the memory area. At each position, the development tool 522 adds the blocks covered by the selection 1610 to a node in the DAG. Thus, for the row movement 1608, the development tool 522 adds three nodes to the DAG.

The combination movement 1606 operates in the same fashion. In particular, the development tool 522 moves the selection 1612 over the memory area M until the leading edge of the selection 1612 hits a boundary in each direction of movement. Thus, the for the combination movement 1606, the development tool 522 creates four DAG nodes, each associated with four blocks.

Methods and systems consistent with the present invention also provide visualization support for developing data flow programs. As will be explained in more detail below, the development tool 522 supports the visual representation and presentation of: code segments as one or more nodes in a DAG, attributes that signify that a code segment has already executed, is currently executing, or has not yet begun executing, dependencies of a code segment on other code segments with an attribute that signifies whether the dependency has been met, the portions of one or more data structures that are effected by a code segment, and nodes that a selected thread has executed.

Figure 17:
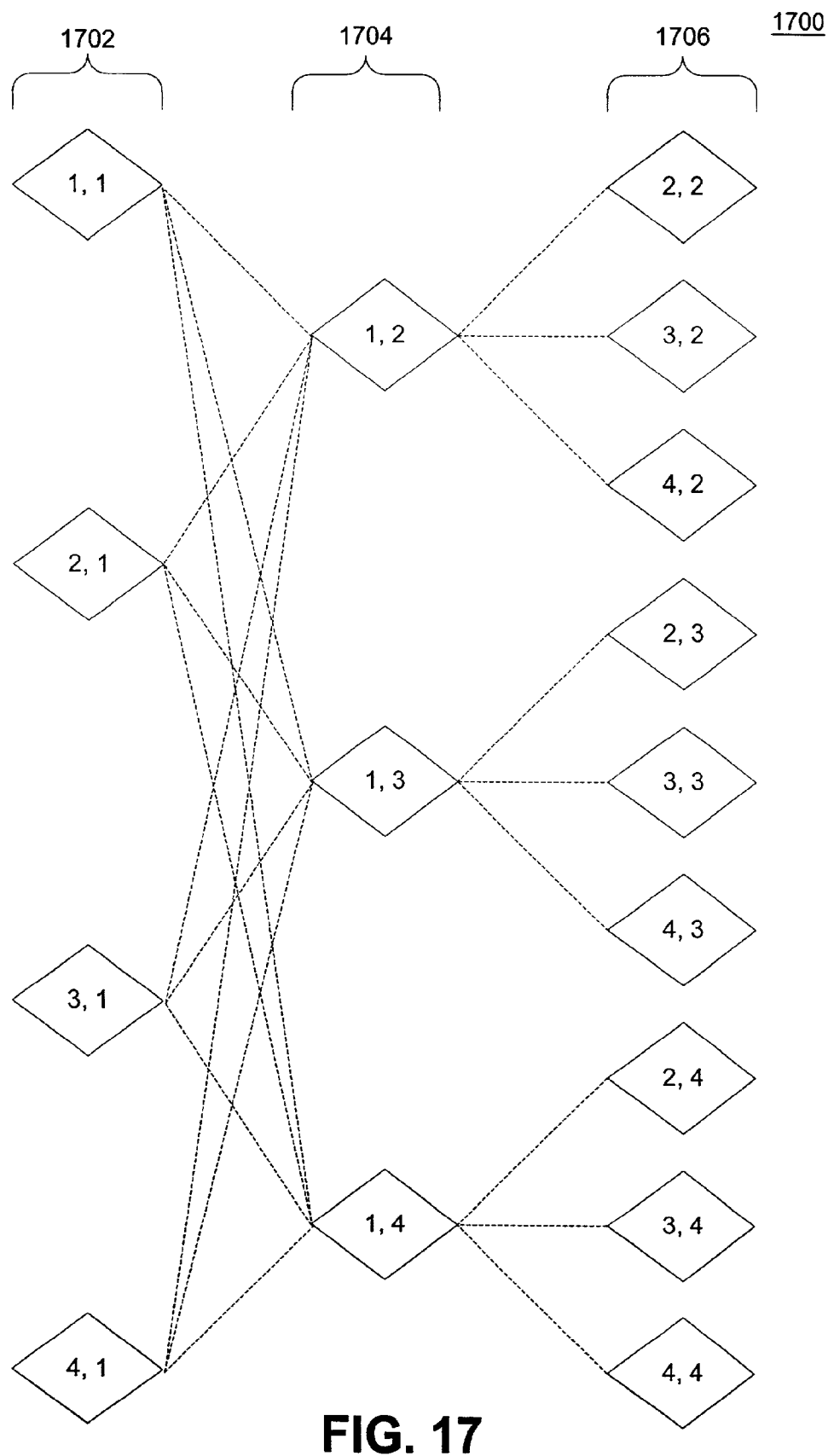
FIG. 17 depicts an example of a directed acyclic graph illustrating the dependency relationships shown in FIGS. 3A and 3B.

For example, FIG. 17 depicts a DAG 1700 illustrating the dependency relationships corresponding to FIGS. 3A and 3B. The DAG 1700 illustrates graphically that the data associated with the blocks sharing the first state 1702 are needed for processing by each of the blocks sharing the second state 1704. In turn, the data associated with the blocks sharing the second state 1704 are needed by the groups of blocks that share the third state 1706.

In this embodiment, the development tool 522 represents an unexecuted code segment as a diamond-shaped node, an executing code segment as a square node, and an executed code segment as a circular node. The development tool 522 also represents an unmet dependency as a dashed arc and a satisfied dependency as a bolded, solid arc. One skilled in the art, however, will recognize that any change in representation of the nodes and arcs (e.g., a change in shape, color, shading, animation, sound, and the like), may be used to represent the nodes and arcs in different states. Thus, the nodes and arcs used in the methods, systems, and articles of manufacture consistent with the present invention are not limited to those illustrated. Rather, the development tool 522 generally presents an unexecuted node using an unexecuted visualization, an executing node using an executing visualization, and an executed node using an executed visualization, while representing arcs with an unsatisfied dependency visualization or a satisfied dependency visualization.

Figure 18:
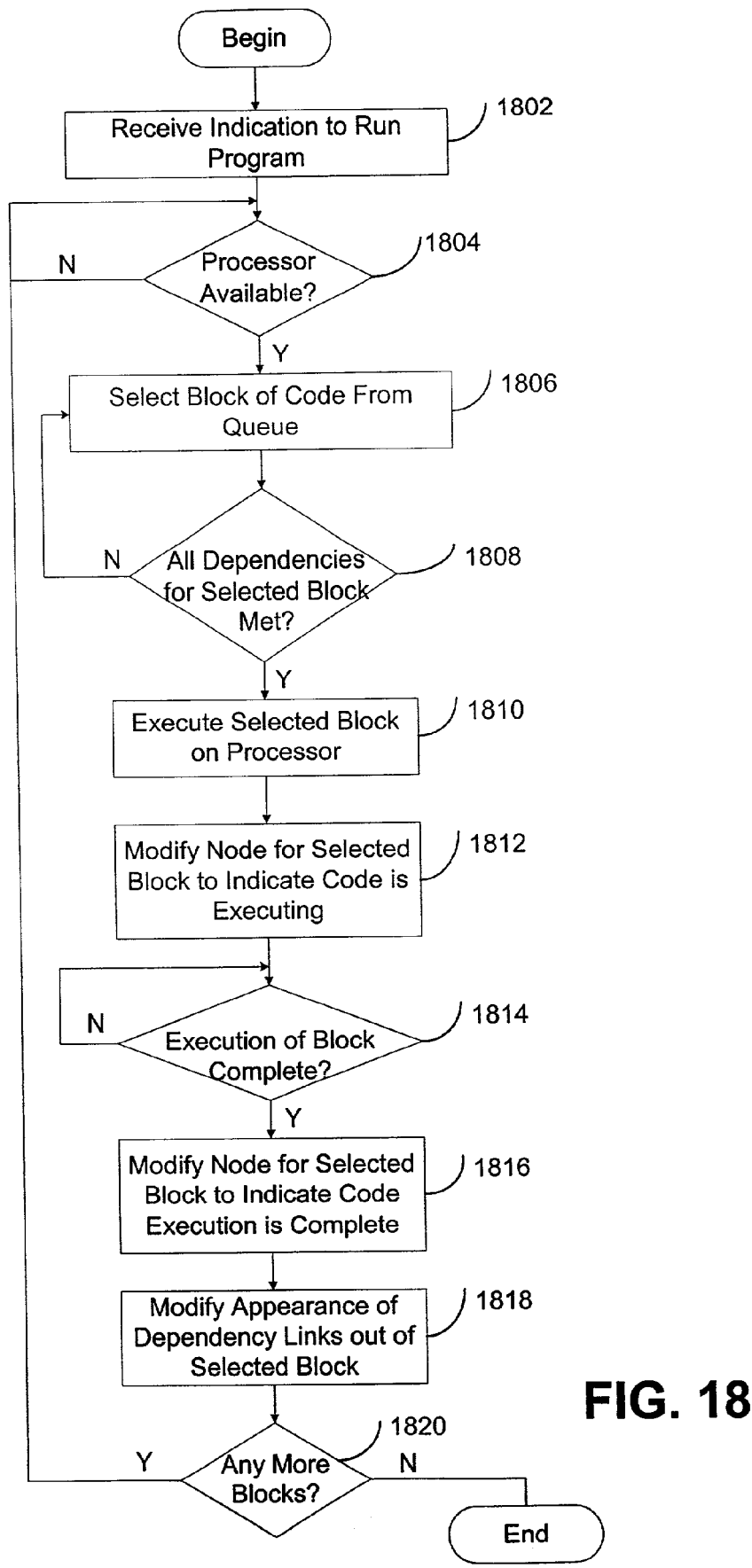
FIG. 18 depicts a flow chart of the steps performed by the data flow program development tool for graphically presenting execution of a data flow program.

FIG. 18 depicts a flow chart of the steps performed by the data flow program development tool 522 for visualization of the state of the code segments on the DAG. Initially, the development tool 522 receives an indication to run the program (step 1802). The next step performed by the development tool 522 is to wait until a processor is available (step 1804). When a processor becomes available, the development tool 522 selects a block and its associated code from the queue (step 1806). The development tool 522 then checks to determine whether all of the dependencies for the selected block are met (step 1808). If all of the dependencies for the selected block of code are met, the development tool 522 executes the selected block on the processor (step 1810). If all of the dependencies for the selected block are not met, then the development tool 522 continues to search for a block of code that does have all of its dependencies met. As a result, the program adapts to different environments (e.g., machine load, number of threads, and the like) by executing the code segments that are ready. Thus, rather than continuing to wait on an originally selected code segment until it is ready to execute, the development tool 522 can execute code segments that become ready sooner than the originally selected code segment. When the selected block is executed, the development tool 522 modifies the node for the selected block to indicate that the code is executing (step 1812). Assuming there are three threads running in parallel, three code segments can be executed simultaneously.

Figure 19:
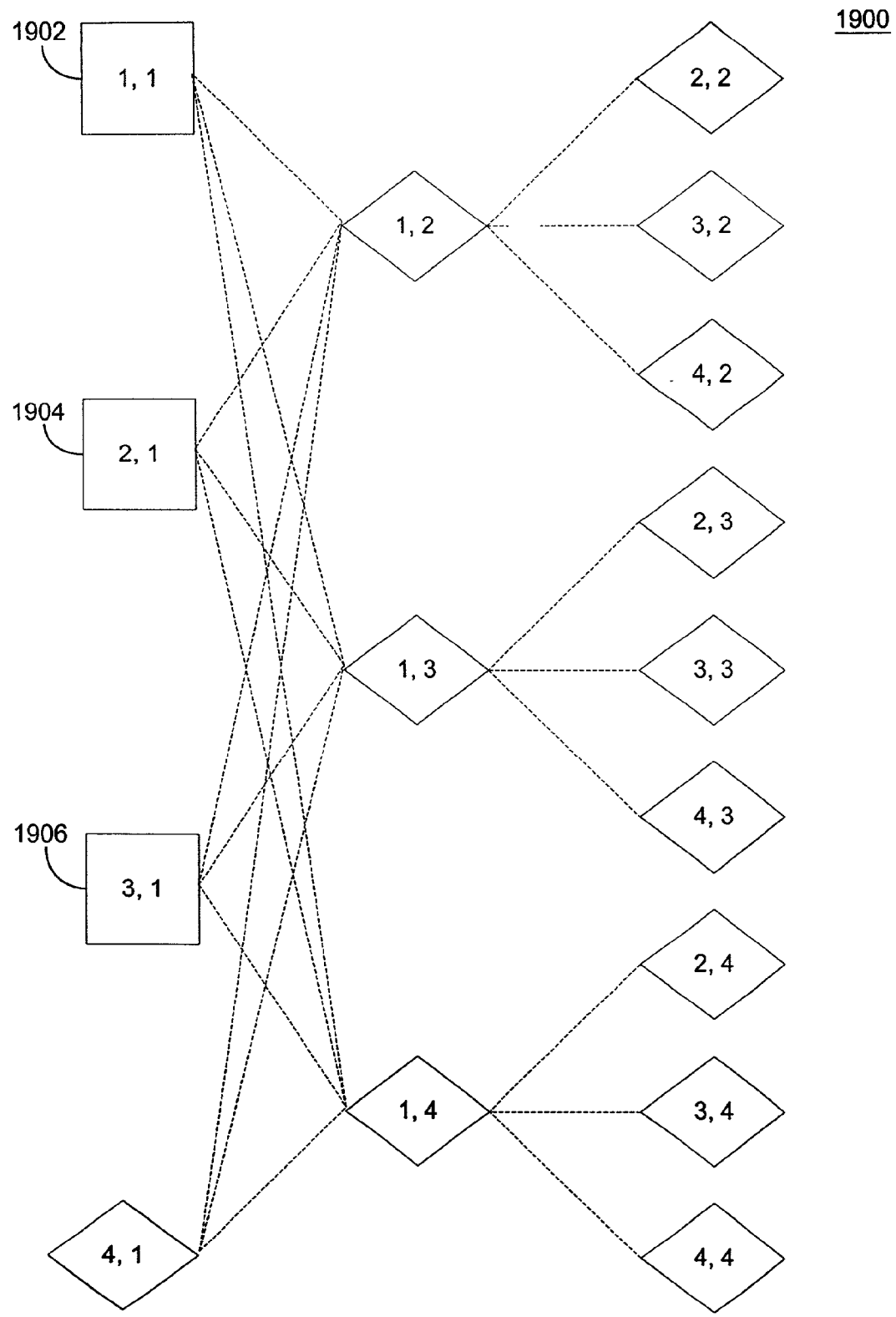
FIGS. 19–25 depict the directed acyclic graph presented in FIG. 17 during the processing of the blocks in the directed acyclic graph.

Thus, as shown in FIG. 19, three of the nodes 1902, 1904 and 1906 on the DAG 1900 are square nodes to indicate that the code segments represented by the nodes are executing.

Figure 20:
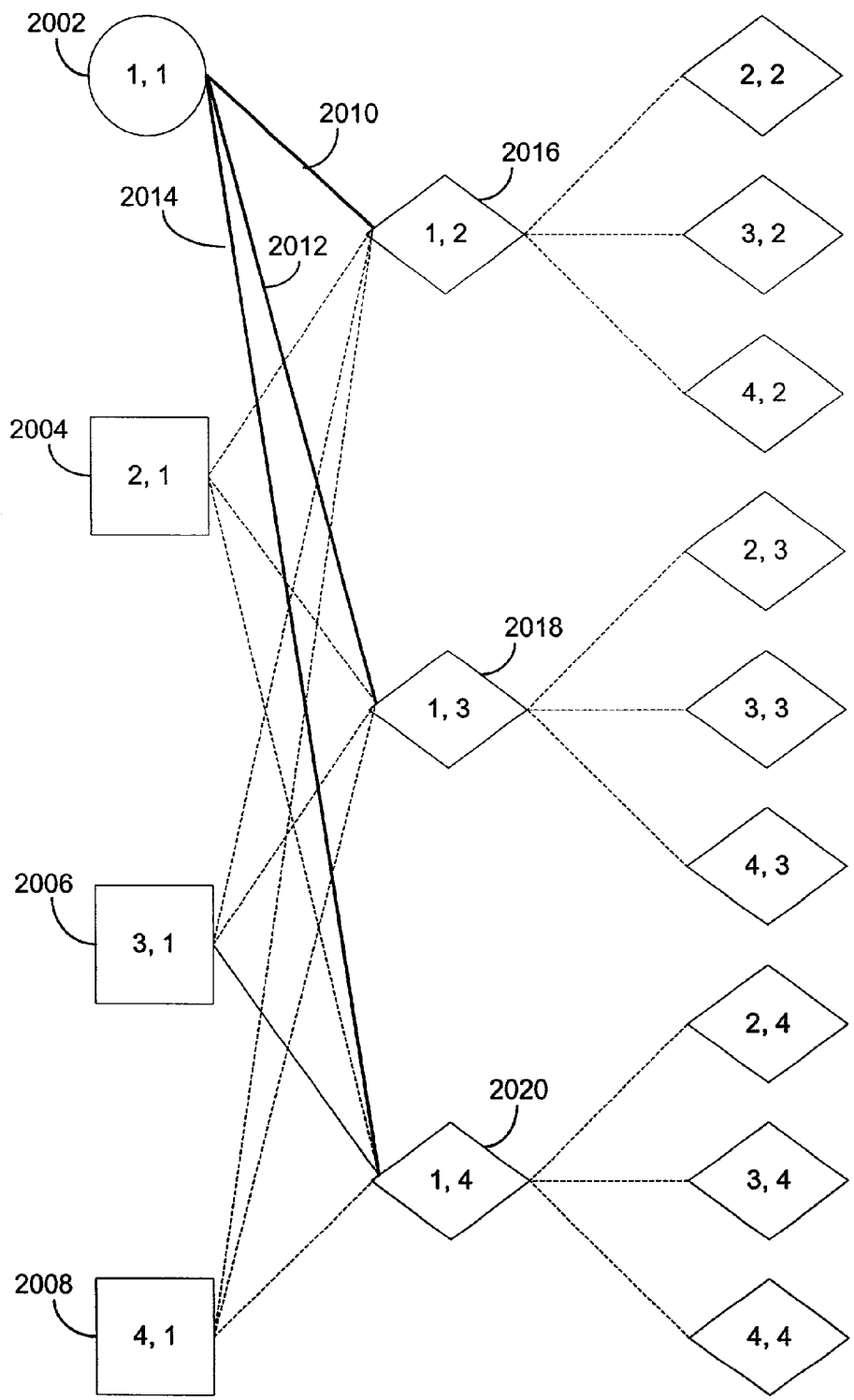

The next step performed by the development tool 522 is to wait until the execution of the block is complete (step 1814). After the execution of the code segment is complete, the development tool 522 modifies the node of the selected block to indicate that the execution is complete (step 1816). The development tool 522 also modifies the appearance of any dependency arcs out of the selected block to indicate that the dependency has been met (step 1818). Thus, after the execution of node 1902 in DAG 1900 is complete, the development tool 522 displays the node 1902 as a circular node 2002 (see the DAG 2000 in FIG. 20). In addition, the development tool 522 displays the arcs 2010, 2012, and 2014 out of node 2002 as bolded, solid arcs 2010, 2012, and 2014 to indicate that the dependencies out of the node 2002 have been met.

Next, the development tool 522 determines whether there are any more blocks on the queue awaiting execution (step 1820). If there are no more blocks, the processing ends. If there are more blocks available, the development tool 522 continues processing at step 1804. Returning to the example depicted in FIG. 20, because the code segment represented by node 2002 is no longer executing, a thread or processor becomes available. Thus, the development tool 522 selects the next block (represented by node 2008) from the queue. Since all dependencies for the selected block are met, the development tool 522 executes the selected block, and represents the node 2008 as a square node to indicate that the code is executing. Meanwhile, the code segments represented by nodes 2004 and 2006 continue to execute.

Figure 21:
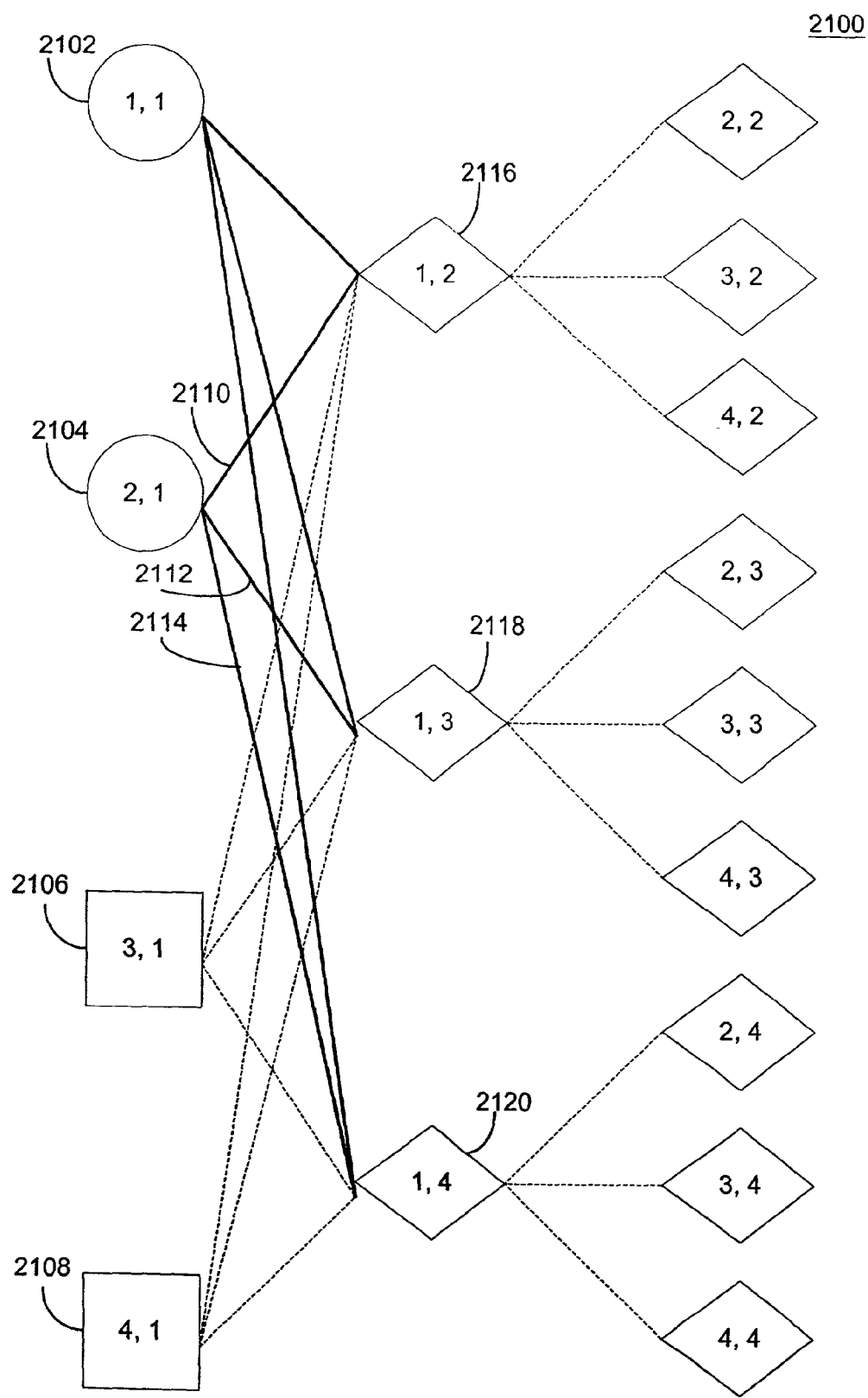

After the execution of the next code segment associated with a block assigned to node 2004, the development tool 522 represents the node 2004 as a circular node 2104 (see FIG. 21). The development tool 522 also modifies the arcs 2110, 2112, and 2114 to indicate that the dependencies from the code segment associated with a block assigned to node 2104 have been met. As shown in FIG. 21, the code segments represented by nodes 2102 and 2104 have been executed, while the code segments represented by nodes 2106 and 2108 are still executing. Because a processor has become available, the tool 522 selects the next block from the queue. This block is represented by node 2116.

Figure 22:
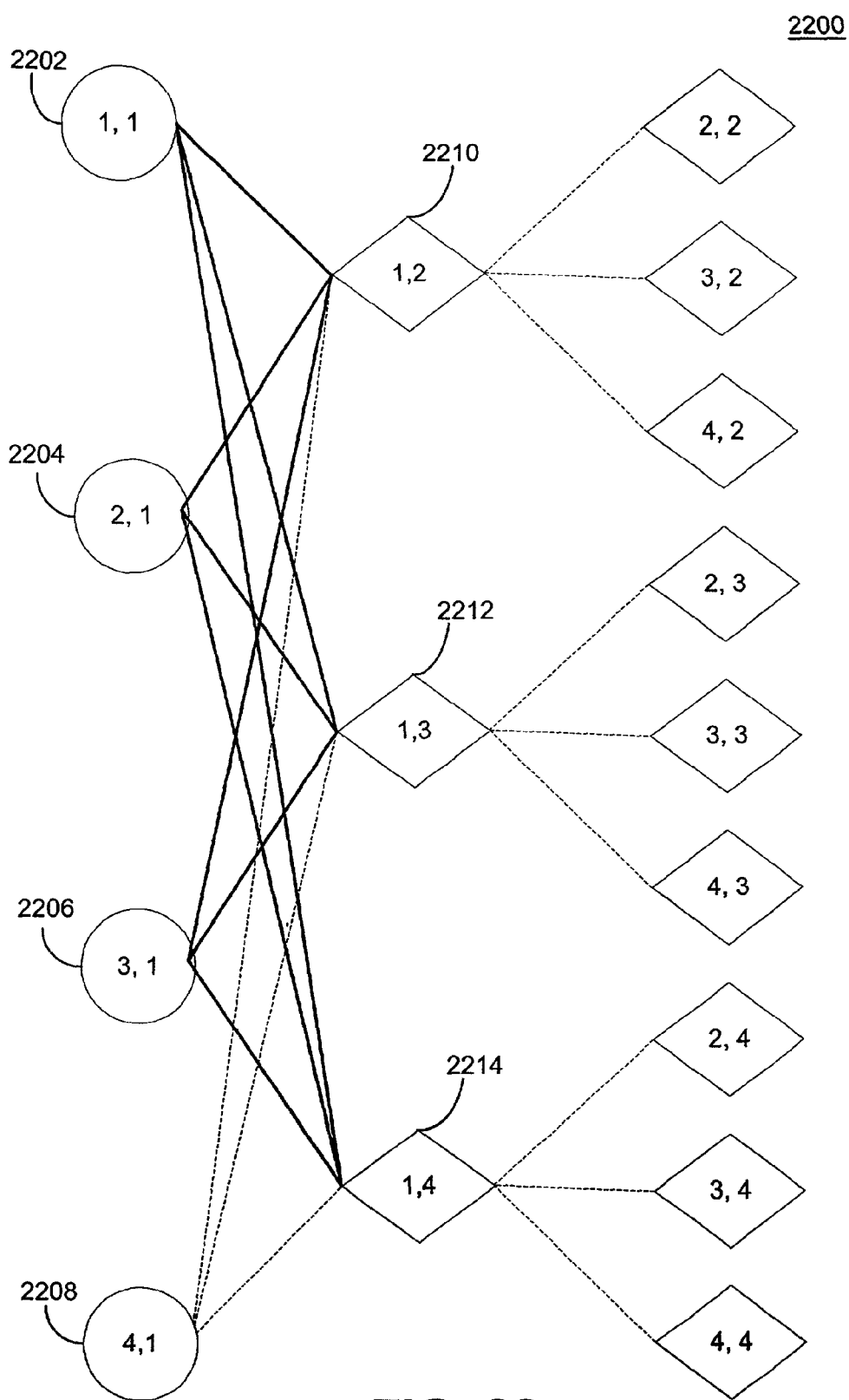

As depicted in the DAG 2100 shown in FIG. 21, two of the dependencies for the block associated with node 2116, represented by arcs out of nodes 2106 and 2108, have not yet been met. Thus, the development tool 522 does not begin execution of the code segment associated with the block for node 2116 (and its shape remains a diamond). Rather, the development tool 522 continues to check the queue for code segments that are ready to execute. However, the only code segments ready to execute are in fact currently executing (2106 and 2108). Thus, only one thread is idle while one thread executes node 2106 and one thread executes node 2108. When the threads finish, the execution of the code segments represented by nodes 2202, 2204, 2206, and 2208 are complete (see DAG 2200 depicted in FIG. 22). Also, at this point, three threads or processors are available and the development tool 522 continues to check the queue for code segments ready to execute. Thus, the development tool 522 selects and executes the next code segments for blocks in the queue represented by nodes 2210, 2212 and 2214.

Figure 23:
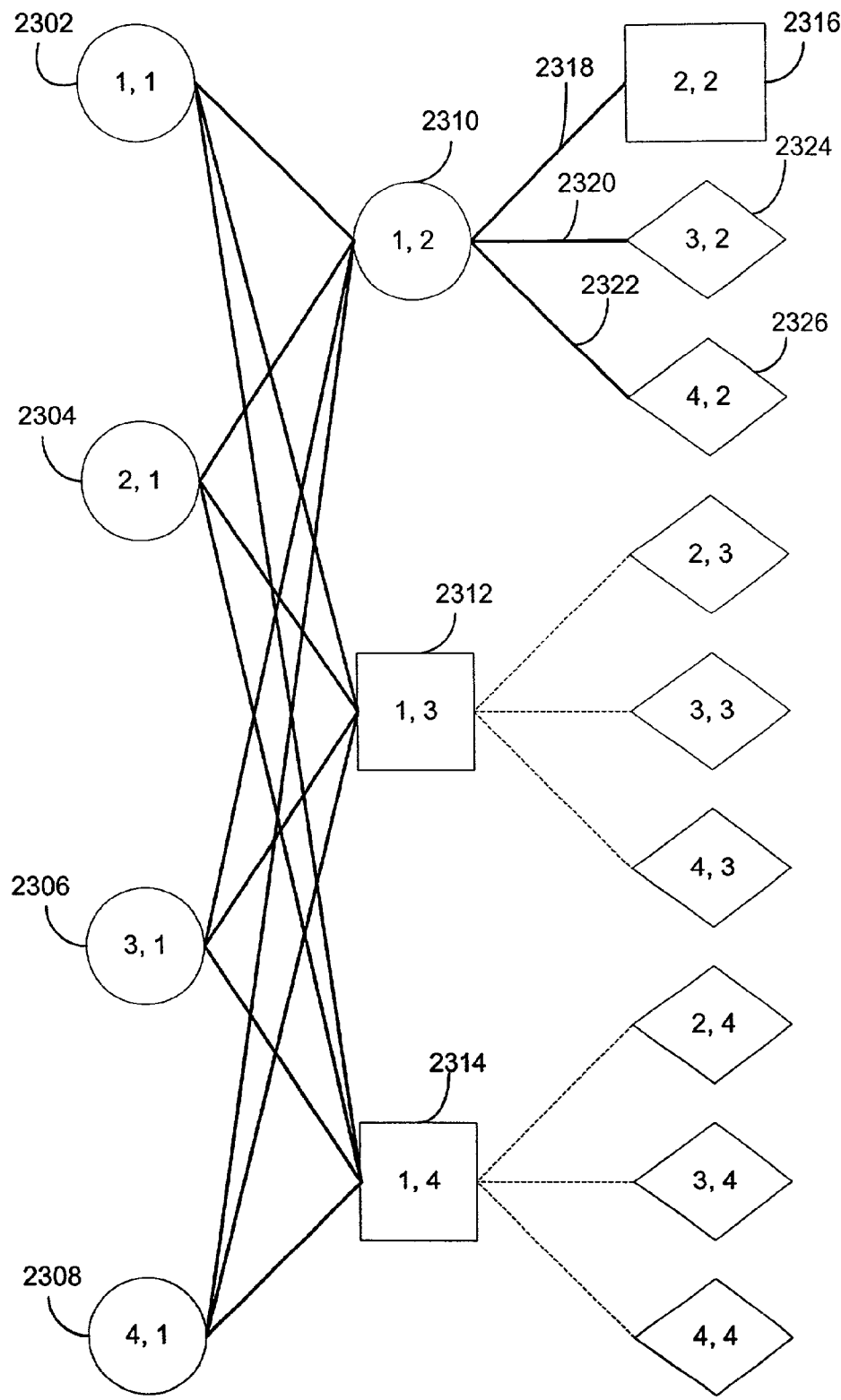
Figure 24:
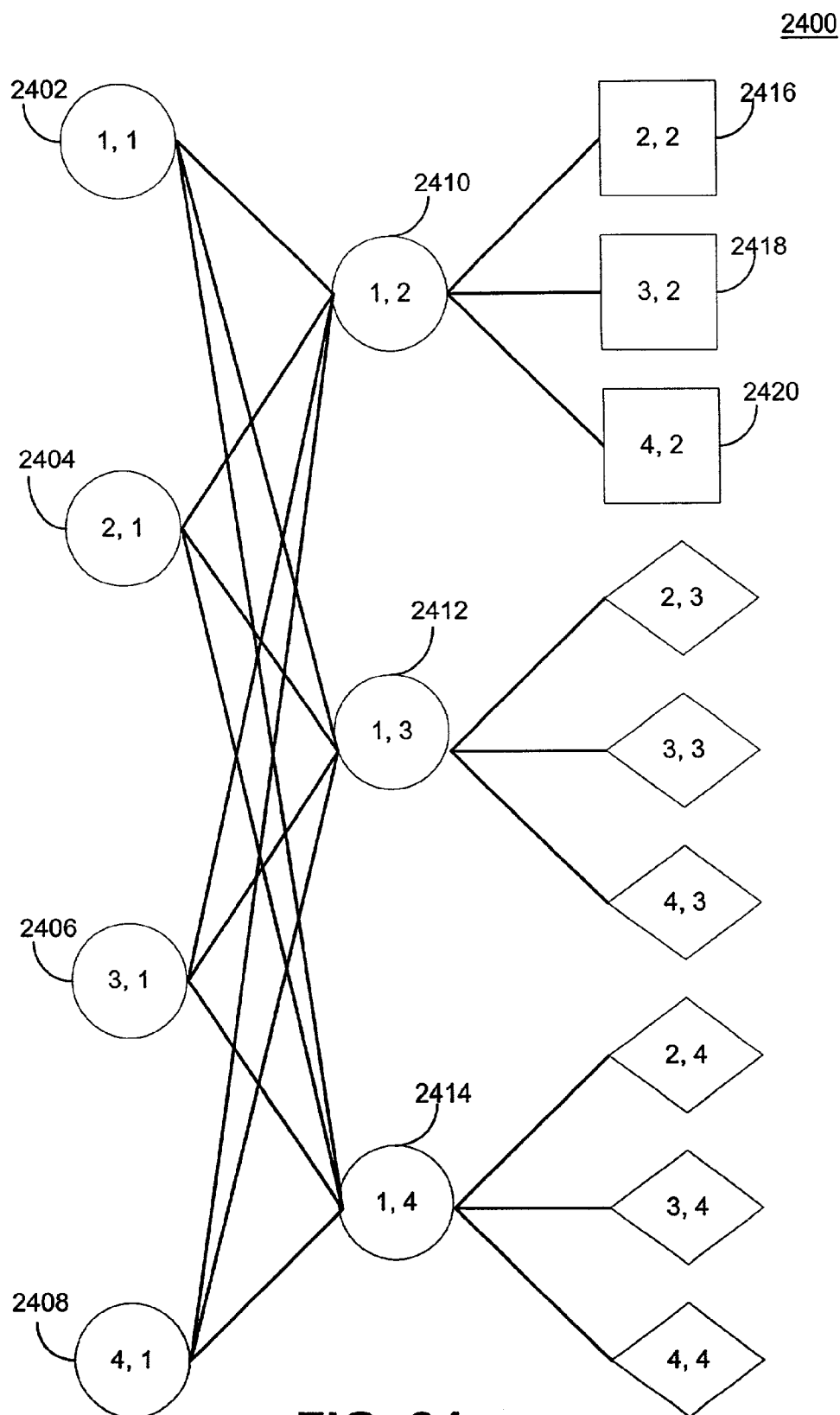
Figure 25:
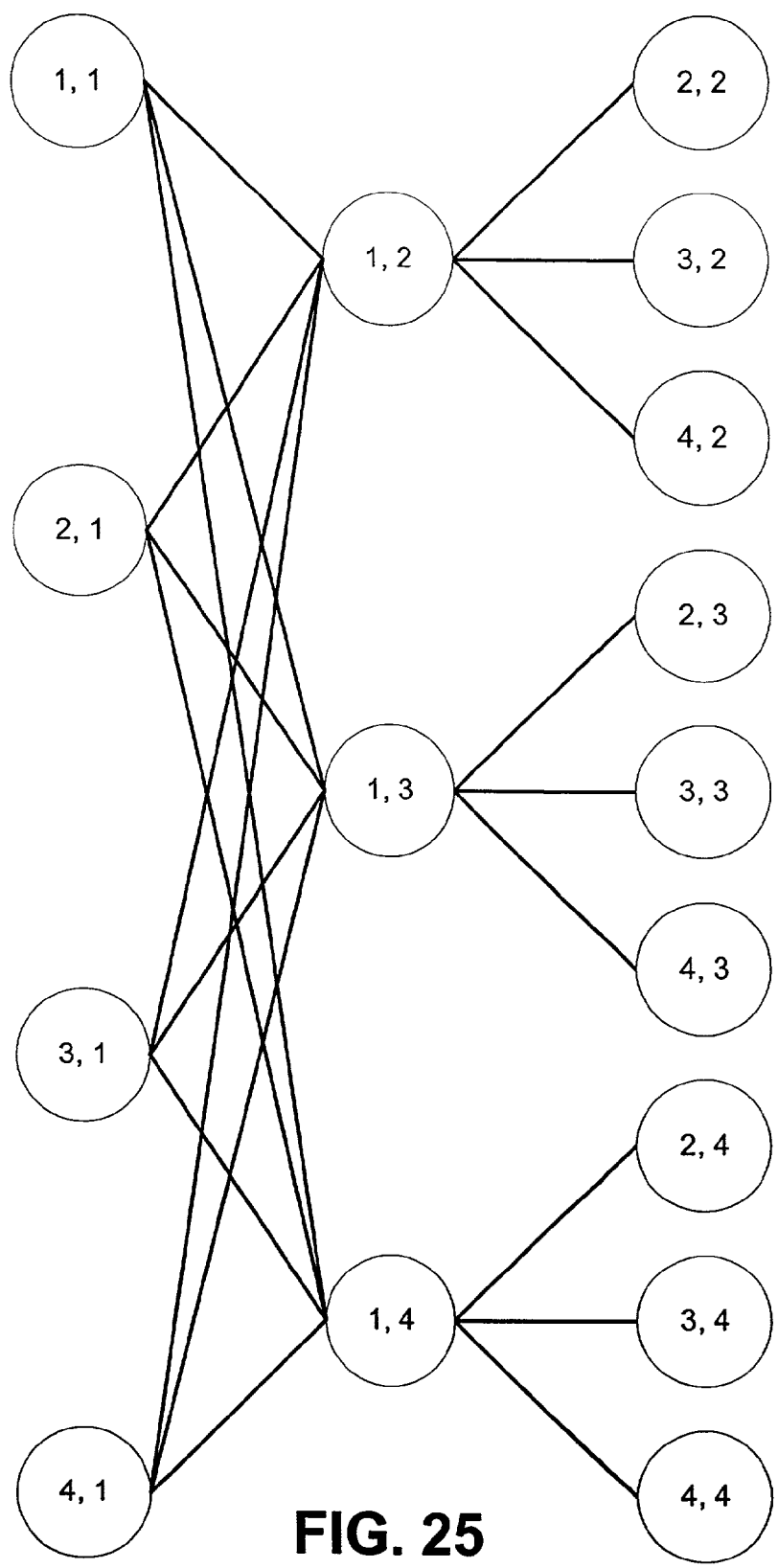

After execution of the code segment associated with the block represented by node 2210, the development tool 522 displays the node as a circular node 2310 (see the DAG 2300 shown in FIG. 23). At this point, the code segments associated with blocks represented by nodes 2302, 2304, 2306, 2308, and 2310 have been executed. In addition, the development tool 522 represents the dependencies out of node 2310 as solid, bolded arcs 2318, 2320, and 2322 to indicate that these dependencies are met. The development tool 522 then selects the next code segment from the queue associated with a block represented by node 2316. The development tool 522 determines that all dependencies for the selected node are met, begins execution of the code associated with the selected node, and represents the selected node as a square node 2316 to indicate that the code segment is executing. Similarly, when the execution of the code segments associated with blocks represented by nodes 2312 and 2314 is also complete, the nodes 2402, 2404, 2406, 2408, 2410, 2412, and 2414, depicted in FIG. 24, indicate that the execution of these code segments is complete. At this point, all dependencies in the DAG 2400 are met. DAG 2500 in FIG. 25 illustrates the state of all nodes and dependencies after all code segments have been executed and all dependencies have been met.

Methods and systems consistent with the present invention allow a programmer to view the dependencies of a code segment on other code segments. The development tool 522 may use different representations for a dependency that has been met and a dependency that has not been yet (as explained above). The dependency view allows a programmer to quickly ascertain the impact of changes to the DAG on other nodes in the DAG.

Figure 26:
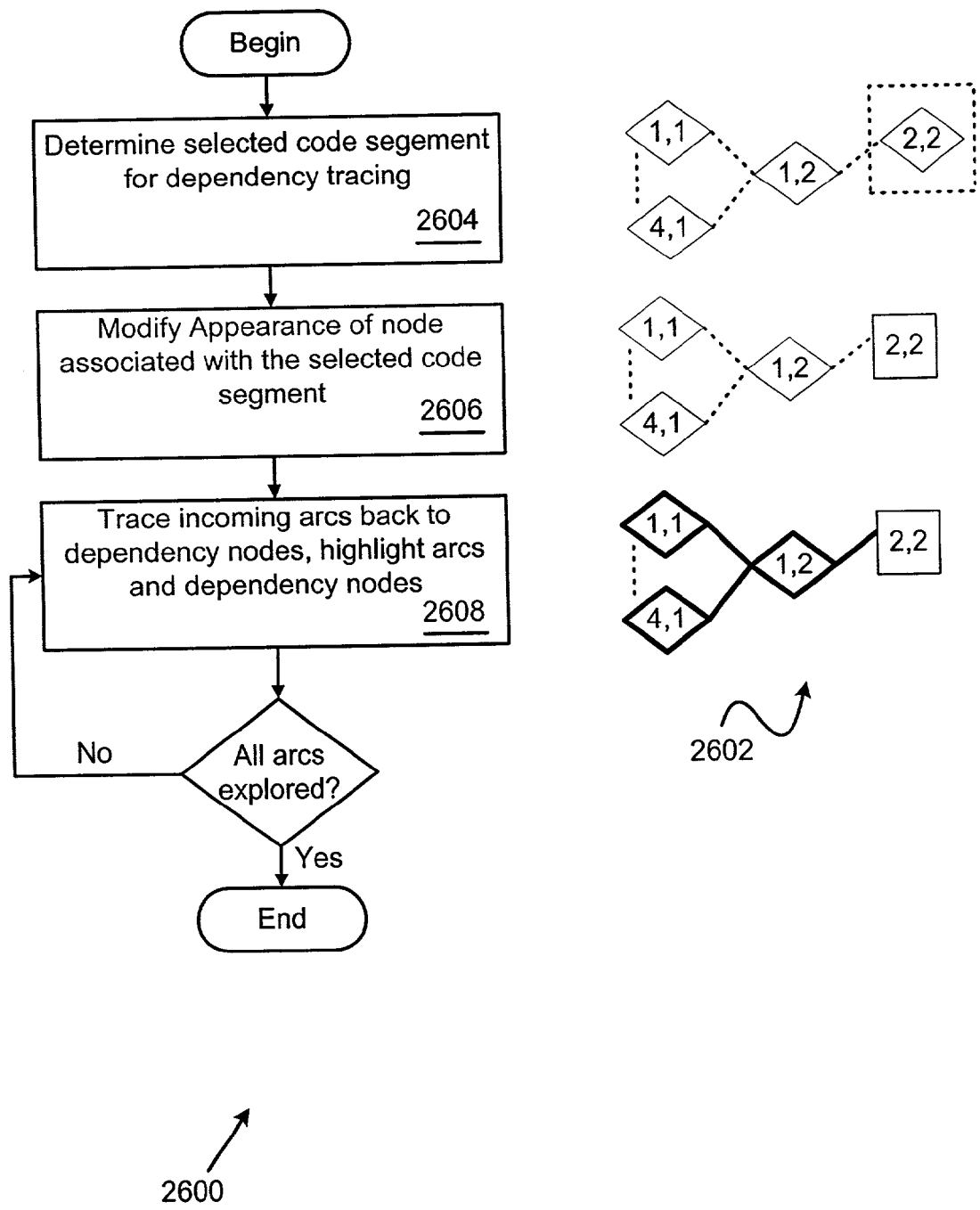
FIG. 26 depicts a flow diagram of the steps performed by the data flow program development tool when determining dependencies for a selected node.

FIG. 26 depicts a flow chart of the steps performed by the data flow program development tool 522 to display the dependencies of a selected code segment. The neighboring DAG portion 2602 illustrates graphically the operation of the development tool 522. Initially, the development tool 522 determines a selected block of code through keyboard or mouse input, as examples (step 2604). The selected block of code is generally associated with a block and a node in the DAG. Thus, the development tool 522 may optionally modify the appearance of the associated node in the DAG (step 2606). As examples, the associated node may change in appearance from a diamond to a square, become bolded, change its line style, and the like.

The development tool 522 continues to trace arcs back through the DAG (step 2608). As development tool 522 finds new dependencies the dependencies are highlighted for the programmer. When there are no arcs left to explore, the processing ends.

The development tool 522 may also present to the programmer portions of data that are affected by a code segment. For example, the development tool 522 may show a view of the elements of a data structure, the elements of an array, and the like. As the data flow program executes, the development tool 522 highlights the data that one or more code segments currently executing are modifying.

Figure 27:
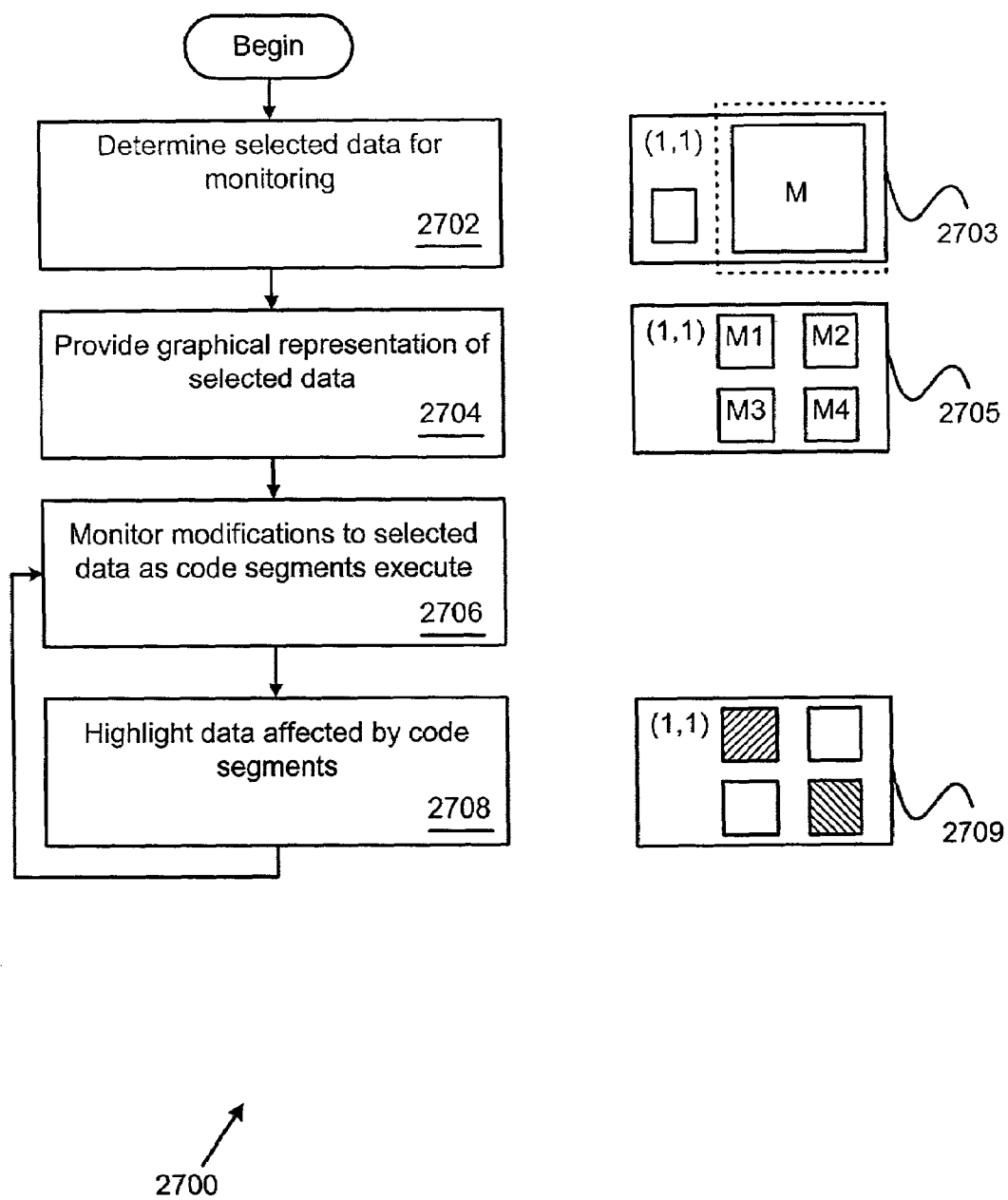
FIG. 27 depicts a flow diagram of the steps performed by the data flow program development tool when highlighting data affected by code segments.

Turning next to FIG. 27, that figure presents a flow diagram 2700 of the steps performed by the development tool 522 when presenting to the programmer portions of data that a code segment effects. The development tool 522 determines the selected data for monitoring (step 2702). Thus, as shown in the node view 2703, the programmer has selected, using the dashed selector box, a data element associated with the node. In particular, the programmer has selected the matrix M.

Subsequently, the development tool 522 provides a graphical representation of the matrix M (step 2704). As shown in the node view 2705, the matrix is shown with boxes representing its constituent elements M1, M2, M3, and M4. The development tool 522 monitors for reads and/or writes to the selected data as threads execute code segments associated with DAG nodes (step 2706). When the development tool 522 detects that the selected data has been affected by a code segment, the development tool 522 highlights or otherwise modifies the graphical representation so that the programmer can observe which parts of the selected data are changing. For example, in the node view 2709, the development tool 522 has cross-hatched elements M1 and M4 to show that an executing code segment is reading or writing to those elements.

An additional visualization option available to the programmer is the thread path view. When the programmer selects the thread path view, the development tool 522 provides the programmer with a display that shows, for each thread selected by the programmer, the set of nodes executed by those threads. As a result, the programmer can ascertain which threads are under or over utilized, for example, and experiment with modifications to the data flow program that allow the data flow program to perform better.

Figure 28:
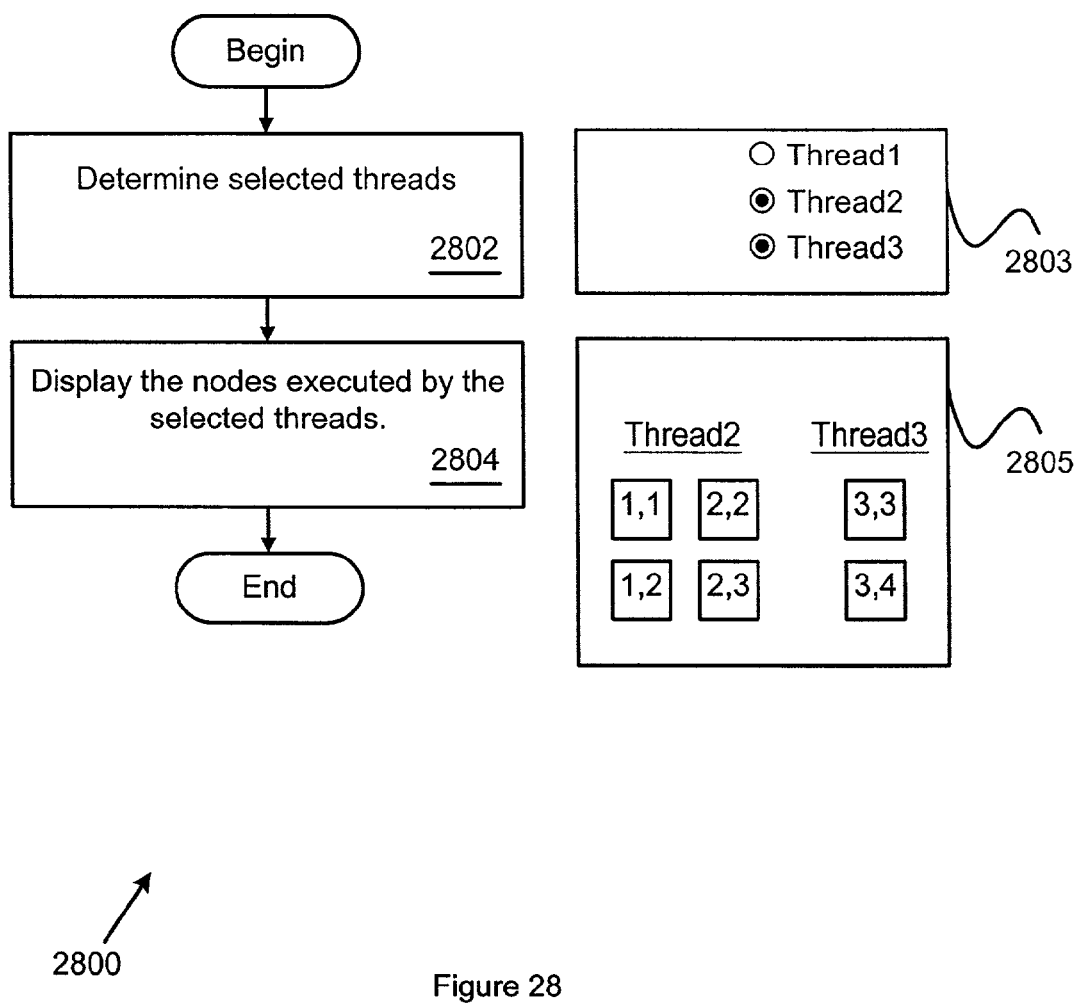
FIG. 28 depicts a flow diagram of the steps performed by the data flow program development tool when displaying the nodes executed by selected threads.

Turning to FIG. 28, that figure presents a flow diagram 2800 of the steps performed by the development tool 522 when presenting to the programmer a thread path view. The development tool 522 determines the threads selected by the programmer (in this instance using a radio button selection) (step 2802). Thus, as shown in the selection box 2803, the programmer has selected, thread 2 and thread 3.

Subsequently, the development tool 522 displays the nodes executed by the selected threads. For example, the thread path view 2805 shows that thread 2 executed nodes (1,1), (1,2), (2,2), and (2,3), and that thread 3 executed nodes (3,3) and (3,4). Alternatively, the development tool 522 may present the thread path view by highlighting nodes on a DAG in correspondence with colors, line styles, and the like assigned to threads.

The thread path view indicates which threads executed which nodes. To that end, the development tool 522 may maintain execution information during data flow program execution that is useful for presenting the thread path view. The execution information may include, as examples, a time stamp, thread identification, node identification, and the like.

As noted above, the development tool 522 also provides debugging functions. The debugging functions respond to debugging commands that include, as examples, the ability to step to a point in data space, the ability to single step in data space (step debugging commands), the ability to add breakpoints (breakpoint debugging commands), the ability to save program execution information for later replay (replay debugging commands), and the ability to add or delete block dependencies (dependency modification debugging commands).

Figure 29:
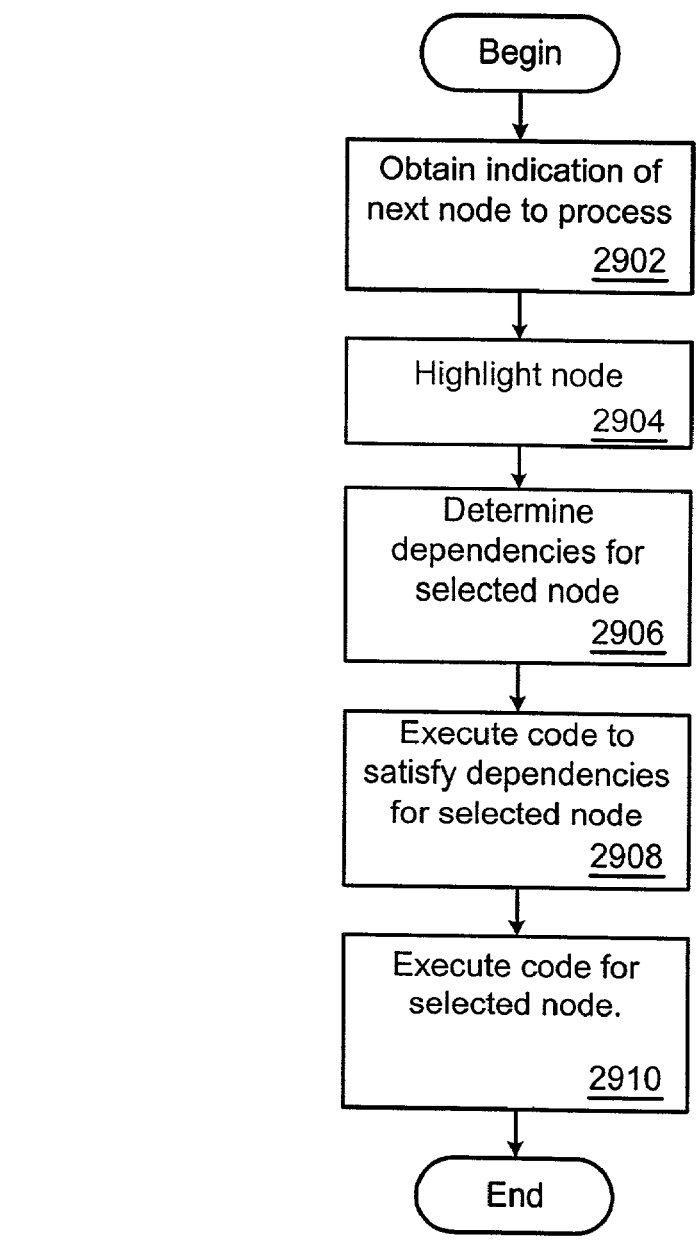
FIG. 29 depicts a flow diagram of the steps performed by the data flow program development tool when stepping to a selected node.

FIG. 29 presents a flow diagram 2900 of the steps performed by the development tool when allowing the programmer to step to a point in data space. The development tool 522 obtains from the programmer an indication (e.g., a mouse click on a DAG node, keyboard input, or the like) of the next node that the programmer wants the development tool 522 to process (step 2902). The development tool 522 then optionally highlights the selected node and determines the dependencies for the selected node (steps 2904 and 2906).

In other words, before the development tool 522 executes the code for the selected node, the development tool 522 first satisfies the dependencies for the selected node (step 2908). Once the dependencies for the selected node are satisfied, the development tool 522 executes the code for the selected node (step 2910). Processing then stops and the programmer may review the results obtained by execution of the selected node.

Figure 30:
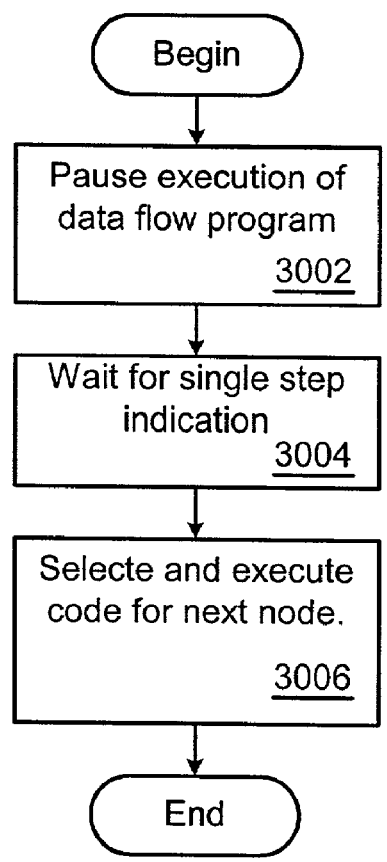
FIG. 30 depicts a flow diagram of the steps performed by the data flow program development tool when single stepping data flow program execution.

Turning next to FIG. 30, that figure illustrates a flow diagram 3000 of the steps performed by the development tool 522 when allowing the programmer to single step the execution of a data flow program. The development tool 522 pauses execution of the data flow program and waits for an indication from the programmer to perform a single step (steps 3002 and 3004). When the development tool 522 receives the indication, the development tool 522 selects and executes code for the next node in the queue (step 3006). Processing then stops and the programmer may review the results obtained by execution of the selected node.

Figure 31:
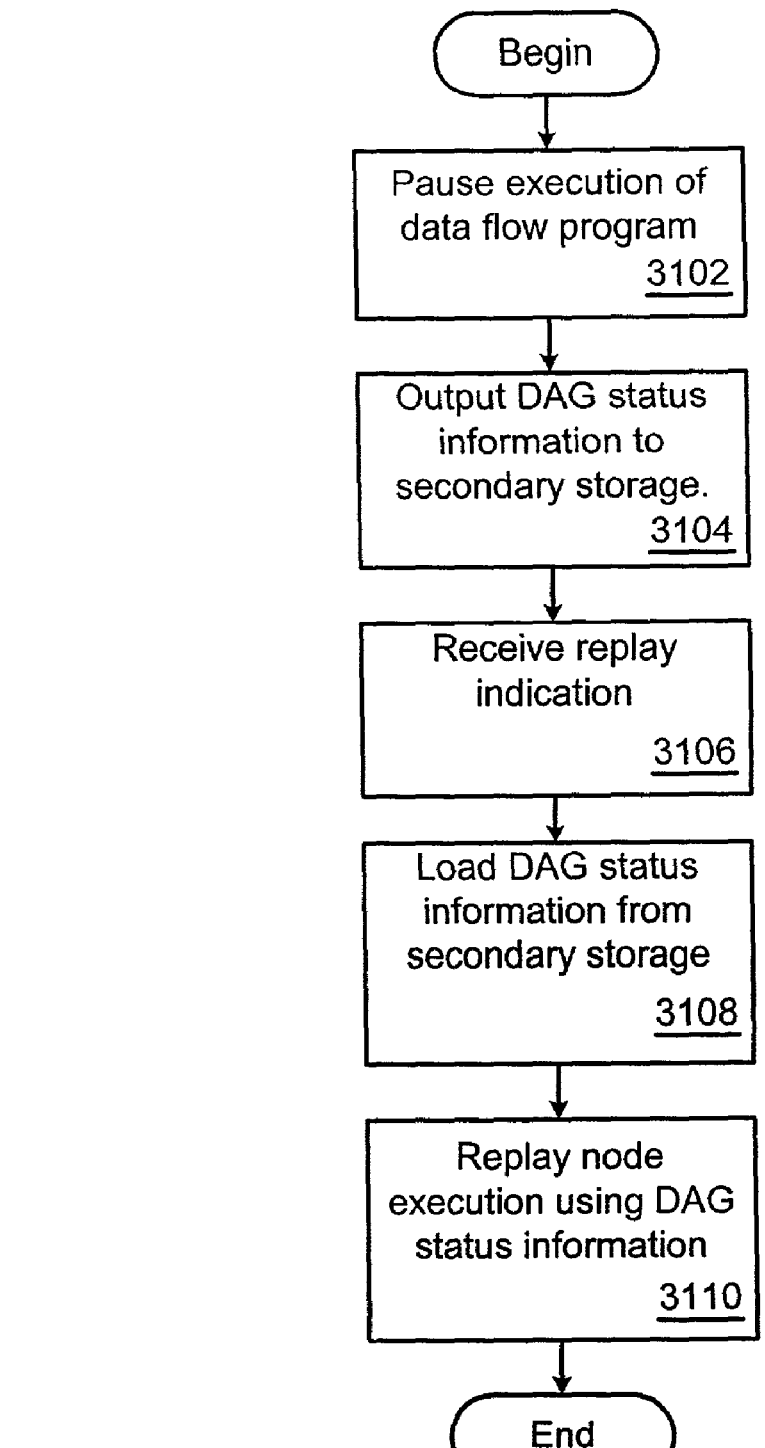
FIG. 31 illustrates a flow diagram of the steps performed by the data flow program development tool when saving and replaying data flow program execution.

With regard next to FIG. 31, that figure illustrates a flow diagram 3100 of the steps performed by the development tool 522 when allowing the programmer to save and replay program execution information. The development tool 522 pauses execution of the data flow program and outputs DAG status information to secondary storage (e.g., a file) (steps 3102 and 3104). The DAG status information provides a history of execution of DAG nodes which the development tool 522 may use to replay (e.g., visually on a display) execution of nodes over time. To that end, the development tool 522 may save, as examples, the DAG structure, node timestamps of execution, breakpoints, thread identifications for executed nodes, dependency status, programmer selected step points, ordering of nodes in the queue, and the like as DAG status information.

Thus, when the development tool 522 receives a replay indication from the programmer, the development tool 522 loads DAG status information from the secondary storage (steps 3106 and 3108). The development tool 522 may then replay node execution (e.g., by presenting a visual representation of a DAG over time) by highlighting (or displaying as text output) the execution of nodes in the DAG over time (step 3110).

Figure 32:
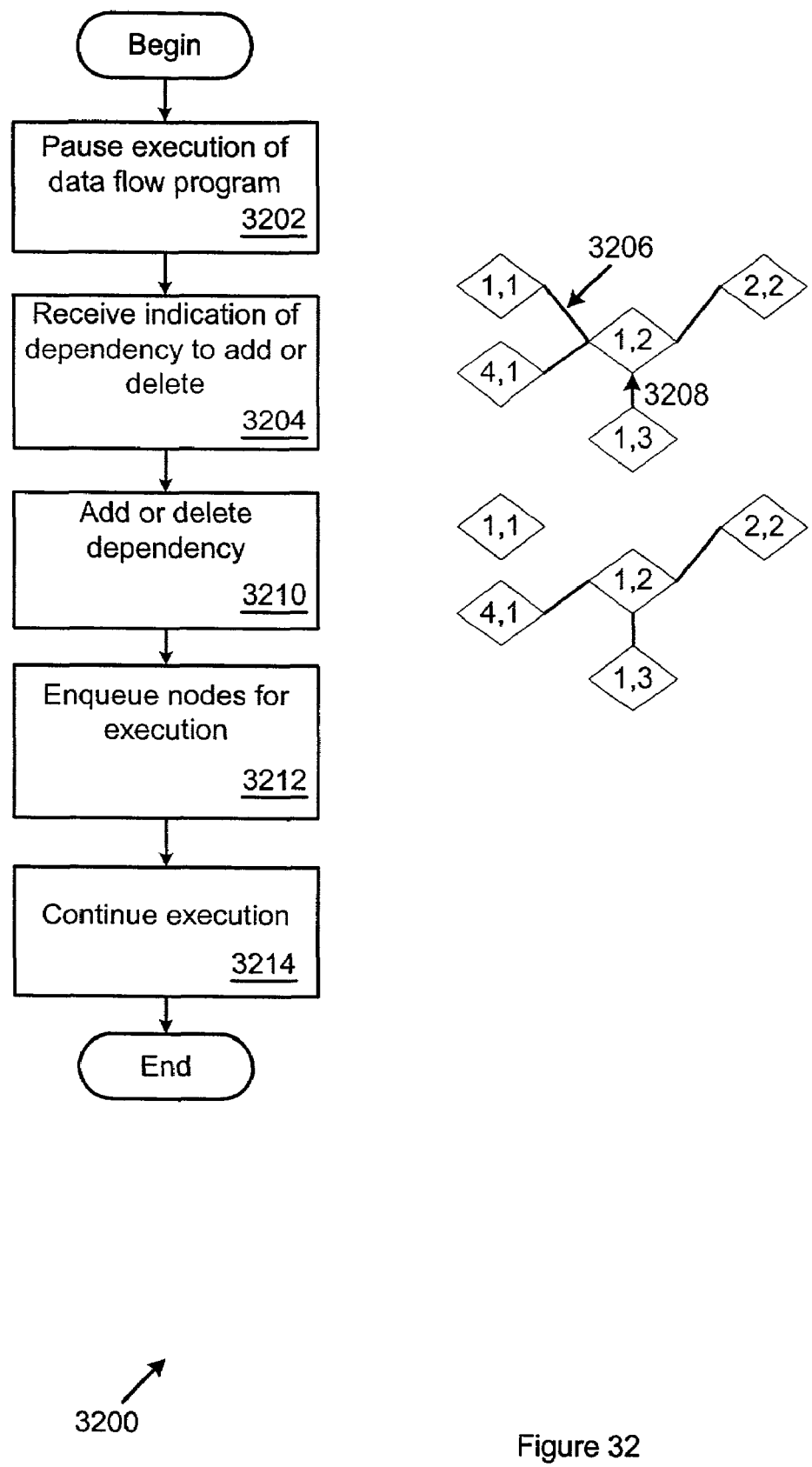
FIG. 32 illustrates a flow diagram of the steps performed by the data flow program development tool when adding or deleting dependencies from a DAG.

With regard next to FIG. 32, that figure illustrates a flow diagram 3200 of the steps performed by the development tool 522 when allowing the programmer to add or delete dependencies. The development tool 522 pauses execution of the data flow program and receives an indication of a dependency to add or delete (steps 3202 and 3204). For example, FIG. 32 shows the programmer using a pointer to specify deletion of dependency 3206 (from node (1,1) to node (1,2)), while adding a dependency 3208 (from node (1,3) to node (1,2)).

In response, the development tool 522 adds or deletes the specified dependencies and enqueues the blocks for processing (steps 3210 and 3212). Execution continues using the newly added or removed dependencies (step 3214). Thus, the programmer, when faced with incorrect execution of a data flow program under development may investigate the cause of the problem, find that a dependency is missing, and add the dependency. Similarly, the programmer may find that a dependency is not in fact necessary and delete the dependency to investigate whether performance improves.

As noted above, the development tool also supports breakpoints. In one implementation, the development tool provides 1) one point, 2) none after, 3) all before, and 4) task node breakpoints specified on nodes. A "one point" breakpoint halts execution of the data flow program when the specified node is selected for execution. A "none after" breakpoint halts execution when a thread selects for execution any node in the DAG after the specified node. An "all before" breakpoint halts execution when all nodes before the specified node complete execution (note that some nodes after the specified node may also complete, depending on the order of node execution). A "task node" breakpoint halts execution when a thread selects a node for execution that is associated with code that performs a designated task (e.g., a matrix multiplication). Breakpoints may be used in combination on the same node, for example, a "one point" breakpoint may be used with a "none after" breakpoint or an "all before" breakpoint, or both.

Figure 33:
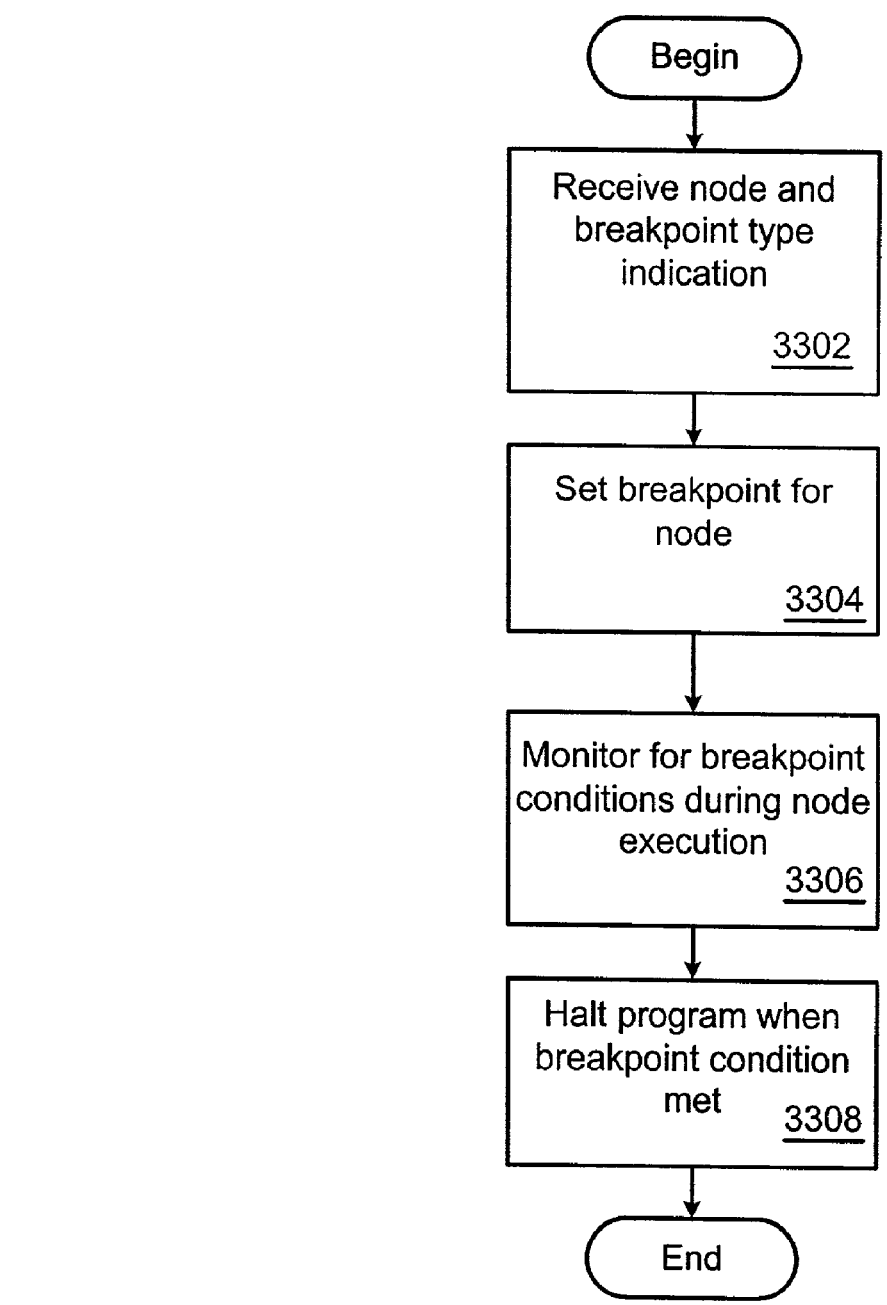
FIG. 33 illustrates a flow diagram of the steps performed by the data flow program development tool when setting and testing for breakpoints.

With reference next to FIG. 33, that figure illustrates a flow diagram 3300 of the steps performed by the development tool 522 when setting and checking breakpoints. The development tool 522 receives a node and breakpoint type indication, and in response sets the breakpoint for the node (steps 3302 and 3304). Then, during execution of the data flow program, the development tool 522 monitors for breakpoint conditions to be met (step 3306). When the development tool 522 determines that the conditions for any particular breakpoint are met, the development tool 522 halts the data flow program (step 3308).

Figure 34:
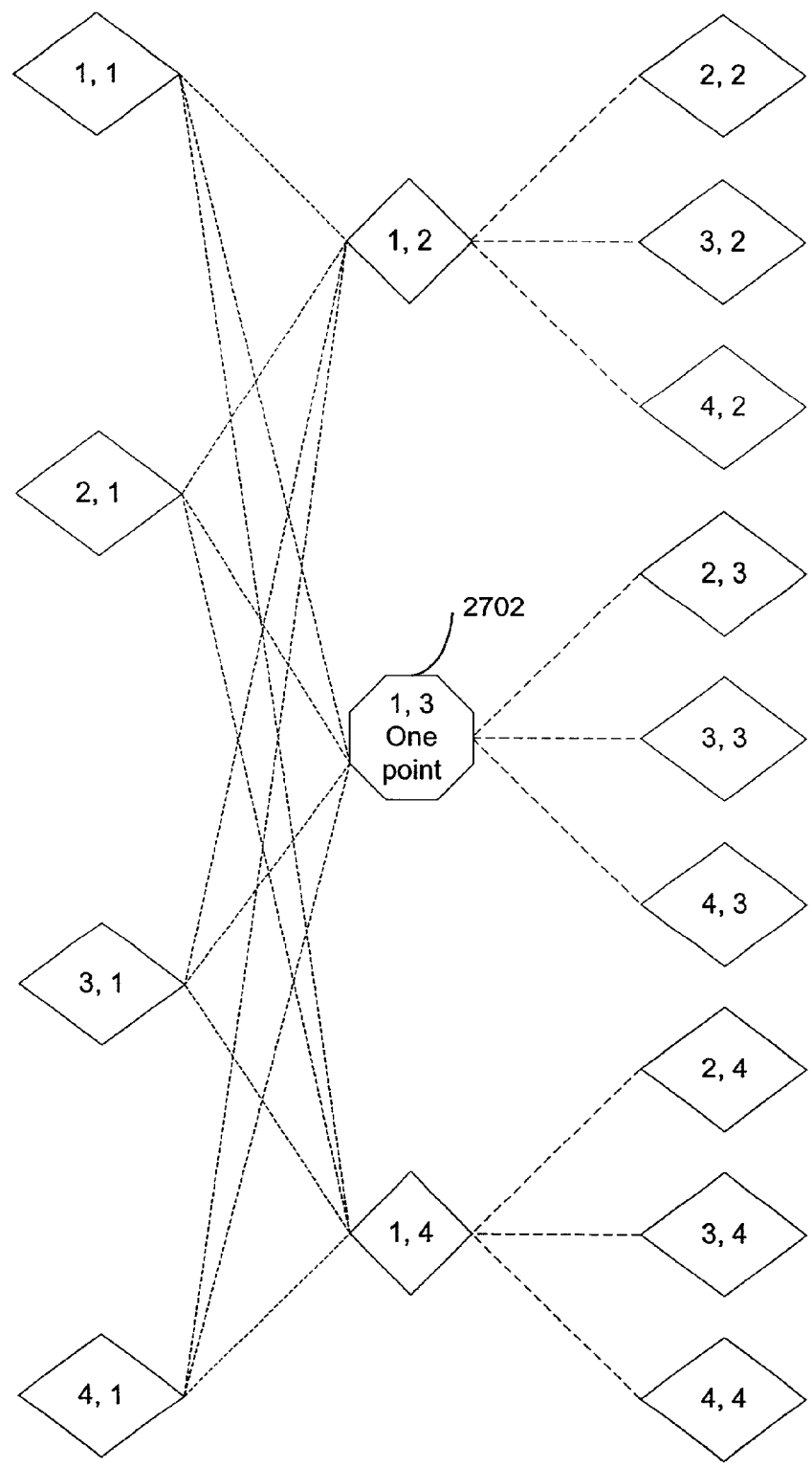
FIG. 34 illustrates a DAG with a breakpoint.
Figure 35:
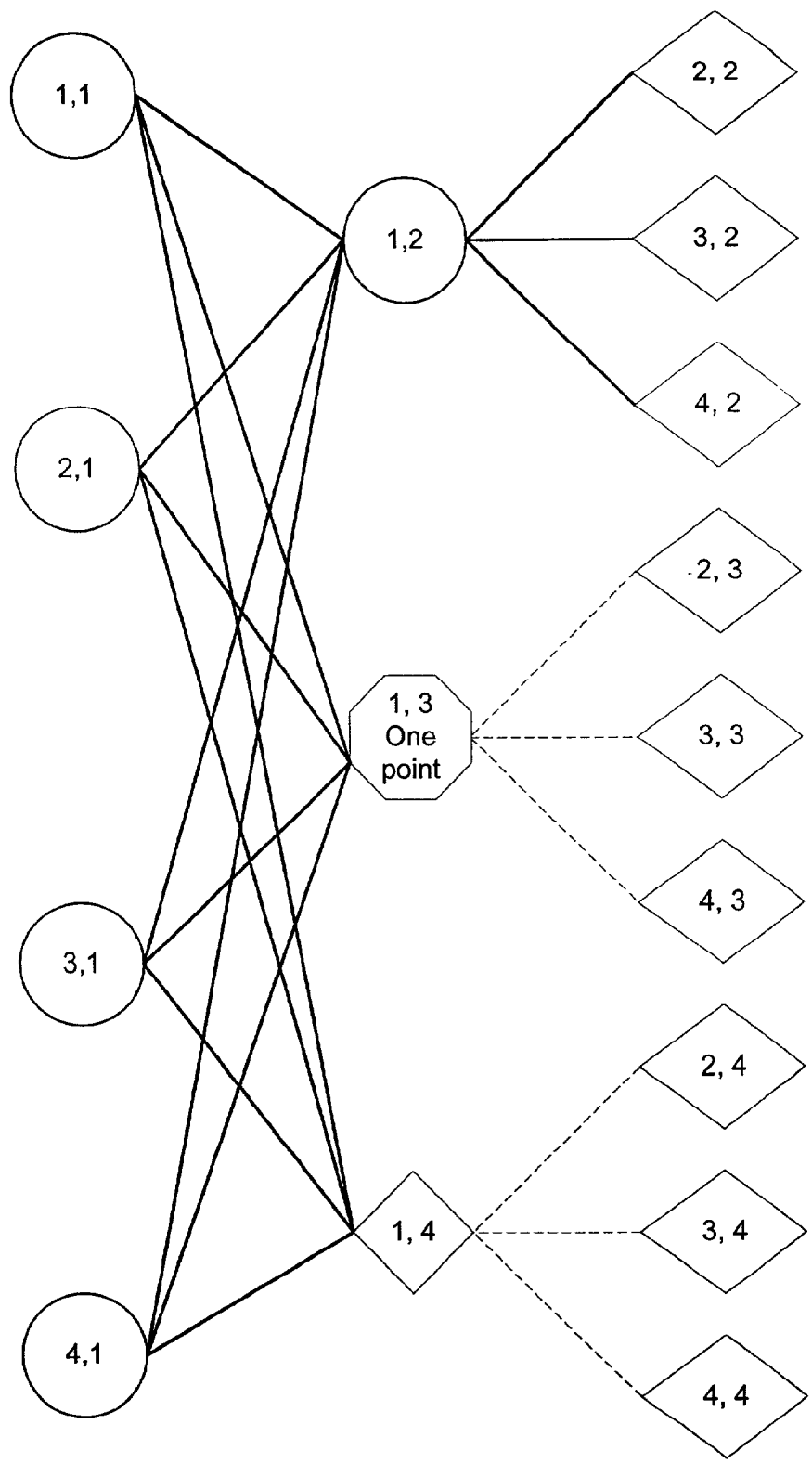
FIG. 35 illustrates a DAG after execution stopped by a breakpoint.

The development tool 522 may display the progress of the data flow program, including breakpoints to the programmer. For example, as shown in FIG. 34, the DAG 3400 illustrates that the programmer has selected node (1,3) as a "one point" breakpoint. During execution, threads first execute nodes (1,1), (2,1), (3,1), and (4,1). A thread then selects and executes node (1,2). At this point, the specified breakpoint still has not been reached. However, assuming that the next thread selects node (1,3) for execution, the development tool 522 recognizes that the "one point" breakpoint has been reached, and halts execution of the data flow program. FIG. 35 shows the state of the DAG when the breakpoint is reached (with circular nodes representing executed nodes).

In one embodiment, the pseudocode 'C' structure shown in Table 1 may be used to represent a node in the DAG:

TABLE 1

```
typedef struct final_dag_node
{
  long       doneflag;  /* clear when node has been processed */
  long       takenflag; /* set when claimed by a thread */
  long       process;   /* process index */
  long       nregions;  /* number of regions */
  nodeRegion *regions;  /* the regions for this node */
  long       numdepend; /* number of dependency groups */
  struct dependency_group *depend; /* pointers to dependency group */
  long       recursion_level; /* level this node is at */
  struct final_dag_node *parent; /* parent if in a subdag */
  struct final_dag_node *next;  /* link to next node in the queue */
  long       endflag;  /*set for nodes with no dependents */
  long       level;    /* depth of dag calls */
  struct final_dag_node *preferred; /* link to the preffred next node */
  long       pref_priority; /* the priority to assign to the
preferred node */
} FinalDagNode;
```

Note that the node structure includes the process (which identifies what task to do), the data regions that will be acted on, the data dependencies which point at the nodes that are needed before this node can execute, and additional status fields.

An exemplary pseudocode 'C' structure shown in Table 2 may be used to define data assigned to blocks:

TABLE 2

```
typedef struct node_regions
{
  long        ndims;      /* number of dimensions */
  long        start[MAX_DIMENSIONS]; /* starting index */
  long        end[MAX_DIMENSIONS]; /* ending index */
  objectSize  *osize;     /*pointer to size object */
}nodeRegion;
```

Dependencies may be stored in groups as illustrated by the pseudocode 'C' structure in Table 3. Each group may include an array of pointers to nodes that the node in question is dependent on.

TABLE 3

```
typedef struct dependency_group
{
  long          ndeps; /* number of dependencies */
  FinalDagNode  **depend; /* pointers to nodes in dependencies */
  struct dependency_group *next; /* link to next group in for the node*/
} DependencyGroup;
```

Methods, systems, and articles of manufacture consistent with the present invention enable a programmer to easily develop data flow programs and to convert existing control flow programs according to the data flow model. By permitting programmers to define memory regions and divide them into blocks with corresponding states (each related to particular control flow program instructions), the development tool 522 facilitates the development of a data flow program for execution in a multiprocessor environment.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The claims and their equivalents define the scope of the invention.

What is claimed is:

1. A computer-implemented method in a data processing system having a computer program for developing a data flow program comprising code segments, the method comprising the steps of:

dividing into blocks a memory area that extends over a data set comprising data operated on by the data flow program;

for each block in the memory area, associating data from the data set with the block and associating at least one code segment with the block;

storing data read and data write identifiers for each code segment, the data read and data write identifiers identifying at least a portion of the data set read or written by the code segment;

determining dependencies between blocks based on the read and write identifiers;

displaying a directed acyclic graph, the directed acyclic graph comprising nodes and arcs, each node representing at least one block, and each arc representing a determined dependency;

initiating execution of the code segments; and while the code segments are executing, determining whether a debugging command has been received; and when it is determined that a debugging command has been received, processing the debugging command.

2. A computer-implemented method in a data processing system having a computer program for developing a data flow program comprising code segments that operate on data in memory, the method comprising the steps of:

dividing a memory area into blocks and associating each block with at least a portion of the data and with at least one code segment;

storing data read and data write identifiers for each code segment, the data read and data write identifiers identifying at least a portion of the data read or written by the code segment;

determining dependencies between blocks based on the read and write identifiers;

generating a graph representation of the data flow program, the graph representation comprising nodes associated with the blocks, and dependencies between the blocks that provide an execution order for the code segments;

executing a debugging command on the data flow program.

3. A method according to claim 2, wherein the debugging command comprises a replay debugging command.

4. A method according to claim 2, wherein the debugging command comprises a dependency modification debugging command.

5. A method according to claim 2, wherein the debugging command comprises a step debugging command.

6. A method according to claim 2, wherein the debugging command comprises a breakpoint debugging command.

7. A method according to claim 2, wherein the debugging command comprises a single point breakpoint command.

8. A method according to claim 2, wherein the debugging command comprises a none after breakpoint command.

9. A method according to claim 2, wherein the debugging command comprises an all before breakpoint command.

10. A method according to claim 2, wherein the debugging command comprises a task node breakpoint command.

11. The method of claim 2, wherein the debugging command comprises a combination single point breakpoint and none after breakpoint command.

12. The method of claim 2, wherein the debugging command comprises a combination single point breakpoint and all before breakpoint command.

13. The method of claim 2, wherein the debugging command comprises a combination single point breakpoint, none after breakpoint, and all before breakpoint command.

14. The method of claim 2, further comprising the step of displaying the graph representation and emphasizing the breakpoint node using a breakpoint visualization.

15. The method of claim 2, wherein the debugging command comprises a dependency modification debugging command, and further comprising the step of:

reordering the nodes for execution to reflect a dependency change.

16. The method of claim 2, wherein the debugging command comprises a step debugging command specifying a selected node associated with a selected node code segment and further comprising the steps of:

determining dependencies for the selected node;

executing nodes to satisfy the dependencies; and executing the selected node code segment.

17. The method of claim 2, wherein the debugging command comprises a replay debugging command and further comprising the step of:
saving graph status information in secondary storage.

18. The method of claim 2, wherein the debugging command comprises a replay debugging command and further comprising the steps of:
retrieving graph status information from secondary storage; and
replaying execution of the nodes in accordance with the graph status information.

19. The method of claim 18, wherein the graph status information includes node timestamps of execution and wherein the step of replaying comprises the step of graphically emphasizing the nodes in the graph representation based on the node timestamps of execution.

20. A computer-implemented method in a data processing system having a computer program for developing a data flow program comprising nodes, the method comprising the steps of:
initiating execution of the data flow program; and
executing a debugging command on the data flow program,
wherein dependencies between nodes are determined based on data read and data write identifiers for code segments associated with the respective nodes, the data read and data write identifiers identifying at least a portion of data read or written by the code segment.

21. A method according to claim 20, wherein the step of initiating execution comprises the steps of determining the data dependencies between the nodes and enqueueing the nodes in accordance with the data dependencies.

22. A method according to claim 20, wherein the step of executing a debugging command comprises the step of executing a breakpoint debugging command.

23. A method according to claim 20, wherein the step of executing a debugging command comprises the step of executing a dependency modification debugging command.

24. A method according to claim 20, wherein the step of executing a debugging command comprises the step of executing a step debugging command.

25. A method according to claim 20, wherein the step of executing a debugging command comprises the step of executing a replay debugging command.

26. A computer-readable medium containing instructions that cause a data processing system to perform a computer-implemented method for developing a data flow program comprising code segments that operate on data in memory, the method comprising the steps of:
dividing a memory area into blocks and associating each block with at least a portion of the data and with at least one code segment;
storing data read and data write identifiers for each code segment, the data read and data write identifiers identifying at least a portion of the data read or written by the code segment;
determining dependencies between blocks based on the data read and data write identifiers;
generating a graph representation of the data flow program, the representation comprising nodes associated with the blocks, and dependencies between the blocks that provide an execution
order for the code segments;
executing a debugging command on the data flow program.

27. A computer-readable medium according to claim 26, wherein the debugging command comprises a replay debugging command.

28. A computer-readable medium according to claim 26, wherein the debugging command comprises a dependency modification debugging command.

29. A computer-readable medium according to claim 26, wherein the debugging command comprises a step debugging command.

30. A computer-readable medium according to claim 26, wherein the debugging command comprises a breakpoint debugging command.

31. The computer-readable medium of claim 26, wherein the breakpoint debugging command comprises a single point breakpoint command.

32. The computer-readable medium of claim 26, wherein the breakpoint debugging command comprises a none after breakpoint command.

33. The computer-readable medium of claim 26, wherein the breakpoint debugging command comprises a all before breakpoint command.

34. The computer-readable medium of claim 26, wherein the breakpoint debugging command comprises a task node breakpoint command.

35. The computer-readable medium of claim 26, wherein the breakpoint debugging command comprises a combination single point breakpoint and none after breakpoint command.

36. The computer-readable medium of claim 26, wherein the breakpoint debugging command comprises a combination single point breakpoint and all before breakpoint command.

37. The computer-readable medium of claim 26, wherein the breakpoint debugging command comprises a combination single point breakpoint, none after breakpoint, and all before breakpoint command.

38. The computer-readable medium of claim 26, wherein the debugging command comprises a dependency modification debugging command, and wherein the method further comprises the step of:
reordering the nodes for execution to reflect a dependency change.

39. The computer-readable medium of claim 26, wherein the debugging command comprises a step debugging command specifying a selected node associated with a selected node code segment and wherein the method further comprises the steps of:
determining dependencies for the selected node;
executing nodes to satisfy the dependencies; and
executing the selected node code segment.

40. The computer-readable medium of claim 26, wherein the debugging command comprises a replay debugging command and wherein the method further comprises the step of:
saving graph status information in secondary storage.

41. The computer-readable medium of claim 26, wherein the debugging command comprises a replay debugging command and wherein the method further comprises the steps of:
retrieving graph status information from secondary storage; and
replaying execution of the nodes in accordance with the graph status information.

42. The computer-readable medium of claim 41, wherein the graph status information includes node timestamps of execution and wherein the step of replaying comprises the step of graphically emphasizing the nodes in the graph as the nodes executed based on the node timestamps of execution.

43. A data processing system comprising:
   a memory comprising a computer-implemented data flow program and a computer-implemented data flow development tool that associates data processed by the data flow program with blocks in the memory, that associates code segments of the data flow program to the blocks, that stores data read and data write identifiers for each code segment, the data read and data write identifiers identifying at least a portion of the data read or written by the code segment; that determines dependencies between the blocks that provide an execution order for the blocks based on the data read and data write identifiers, that executes code segments in parallel using multiple threads, and that executes debugging commands on the data flow program; and
   a processor that runs the data flow development tool.

44. The data processing system of claim 43, wherein the debugging command comprises a step debugging command.

45. The data processing system of claim 43, wherein the debugging command comprises a replay debugging command.

46. The data processing system of claim 43, wherein the debugging command comprises a single point breakpoint command.

47. The data processing system of claim 43, wherein the debugging command comprises a none after breakpoint command.

48. The data processing system of claim 43, wherein the debugging command comprises an all before breakpoint command.

49. The data processing system of claim 43, wherein the debugging command comprises a task node breakpoint command.

50. The data processing system of claim 43, wherein the debugging command is a dependency modification debugging command.

51. The data processing system of claim 43, wherein the debugging command comprises a step debugging command.

52. The data processing system of claim 43, wherein the debugging command comprises a replay debugging command.

53. A data processing system for developing a computer-implemented data flow program, the data processing system comprising:
   means for apportioning a memory area into regions and associating data and code segments of a data flow program with the regions in which they are stored;
   means for storing data read and data write identifiers in the memory area for each code segment, the data read and data write identifiers identifying at least a portion of the data read or written by the code segment;
   means for determining dependencies between the regions based on the data read and data write identifiers; and
   means for executing debugging commands on the data flow program in the memory area.

54. A computer readable memory device encoded with a computer-implemented data structure accessed by a computer-implemented data flow development tool run by a processor in a computer system, the data structure comprising:
   nodes assigned to at least a portion of data processed by a data flow program comprising code segments, the nodes also assigned to at least one code segment;
   data read and data write identifiers for each code segment, the data read and data write identifiers identifying at least a portion of the data read or written by the code segment;
   dependencies between nodes determined based on the data read and data write identifiers; and
   debugging information specified by a debugging command, wherein the data flow development tool accesses the data structure to execute the debugging command on the data flow program.

55. The computer readable memory device of claim 54, wherein the debugging information comprises an identification of a breakpoint node.

56. The computer readable memory device of claim 54, wherein the debugging command is a step debugging command and wherein the debugging information comprises an identification of a selected node specified by the step debugging command.

* * * * *